US012726844B2

(12) United States Patent
Hu et al.

(10) Patent No.: US 12,726,844 B2
(45) Date of Patent: Sep. 1, 2026

(54) COMMUNICATION METHOD, APPARATUS, AND SYSTEM

(71) Applicant: Huawei Technologies Co., Ltd., Shenzhen (CN)

(72) Inventors: Mengshi Hu, Shenzhen (CN); Jian Yu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 18/619,999

(22) Filed: Mar. 28, 2024

(65) Prior Publication Data

US 2024/0244470 A1 Jul. 18, 2024

Related U.S. Application Data

(63) Continuation of application No. PCT/CN2022/119406, filed on Sep. 16, 2022.

(30) Foreign Application Priority Data

Sep. 29, 2021 (CN) .......................... 202111156203.6

(51) Int. Cl.
*H04W 24/10* (2009.01)
*H04L 1/00* (2006.01)
(Continued)

(52) U.S. Cl.
CPC ........... *H04W 24/10* (2013.01); *H04L 1/0003* (2013.01); *H04L 1/1614* (2013.01); *H04W 80/02* (2013.01)

(58) Field of Classification Search
CPC ..... H04W 24/08; H04W 24/10; H04W 80/02; H04W 84/12; H04L 1/0003; H04L 1/0009;
(Continued)

(56) References Cited

U.S. PATENT DOCUMENTS

2018/0123727 A1 5/2018 Yu et al.
2018/0205442 A1 7/2018 Oteri et al.
(Continued)

FOREIGN PATENT DOCUMENTS

CN 111542087 A 8/2020
CN 112448803 A 3/2021
WO 2021066283 A1 4/2021

OTHER PUBLICATIONS

IEEE Std 802.11a-1999 (Supplemental to IEEE Std 802.11-1999), Part 11: Wireless LAN Medium Access Control (MAC) and Physical Layer (PHY) specifications: High-speed Physical Layer in the 5 GHZ Band, Sep. 16, 1999, total 90 pages.
(Continued)

*Primary Examiner* — Jean A Gelin
(74) *Attorney, Agent, or Firm* — Conley Rose, P.C.

(57) ABSTRACT

A communication method includes a first communication device that sends, to a second communication device, a physical layer protocol data unit (PPDU) including indication information and M link adaptation blocks, where the indication information indicates a resource used for link adaptation, the M link adaptation blocks use different transmission parameters, and the resource is used to transmit the M link adaptation blocks. The second communication device returns, to the first communication device, a feedback result determined based on a measurement result corresponding to the M link adaptation blocks, so that the first communication device sends, based on the feedback result, a PPDU used for data transmission. Hence, the two communication devices complete link adaptation through one interaction, and do not need to perform a plurality of interactions.

20 Claims, 6 Drawing Sheets

First communication device

Second communication device

401: First PPDU: a resource used for link adaptation, and M link adaptation blocks 402: Feedback result: determined based on a measurement result of the M link adaptation blocks

(51) Int. Cl.
*H04L 1/1607* (2023.01)
*H04W 80/02* (2009.01)

(58) Field of Classification Search
CPC ... H04L 1/0026; H04L 1/0031; H04L 1/1614; H04L 5/0048; H04L 5/0094; H04B 7/0619; Y02D 30/70
USPC .......................................................... 370/329
See application file for complete search history.

(56) References Cited

U.S. PATENT DOCUMENTS

| | | | | |
|---|---|---|---|---|
| 2019/0342885 | A1* | 11/2019 | Chun | H04W 4/70 |
| 2021/0058936 | A1* | 2/2021 | Gordaychik | H04W 72/0453 |
| 2021/0281363 | A1 | 9/2021 | Wu et al. | |
| 2021/0337537 | A1* | 10/2021 | Chun | H04W 4/70 |
| 2022/0159500 | A1* | 5/2022 | Ji | H04W 24/10 |
| 2022/0263611 | A1 | 8/2022 | Yu et al. | |
| 2022/0287122 | A1* | 9/2022 | Wang | H04W 8/26 |
| 2022/0417793 | A1* | 12/2022 | Kim | H04L 1/0001 |
| 2023/0076285 | A1* | 3/2023 | Ko | H04W 76/15 |
| 2023/0156864 | A1* | 5/2023 | Hsu | H04L 69/324 370/329 |
| 2023/0319877 | A1* | 10/2023 | Chitrakar | H04W 24/10 370/329 |
| 2023/0362990 | A1* | 11/2023 | Jang | H04L 5/003 |

OTHER PUBLICATIONS

IEEE Std 802.11ac™-2013, Part 11: Wireless LAN Medium Access Control(MAC) and Physical Layer (PHY) Specifications, Amendment 4: Enhancements for Very High Throughput for Operation in Bands below 6 GHz, Dec. 11, 2013, total 425 pages.

IEEE Std 802.11b-1999/Cor Jan. 2001 (Corrigendum to IEEE Std 802. 11b-1999), Part 11: Wireless LAN Medium Access Control (MAC) and Physical Layer (PHY) specifications, Amendment 2: Higher-speed Physical Layer (PHY) extension in the 2.4 GHz band-Corrigendum 1, Nov. 7, 2001, total 24 pages.

IEEE Std 802.11n-2009, Part 11: Wireless LAN Medium Access Control (MAC) and Physical Layer (PHY) Specifications, Amendment 5: Enhancements for Higher Throughput, dated Sep. 11, 2009, total 536 pages.

IEEE P802.11ax™M/D8.0, Oct. 2020, Part 11: Wireless LAN Medium Access Control (MAC) and Physical Layer (PHY) Specifications, Amendment 1: Enhancements for High Efficiency WLAN, total 820 pages.

IEEE Std 802.11g™-2003, Part 11:Wireless LAN Medium Access Control (MAC) and Physical Layer (PHY) specifications, Amendment 4: Further Higher Data Rate Extension in the 2.4 GHz Band, IEEE Computer Society, dated Jun. 12, 2003, total 77 pages.

IEEE P802.11be ™M/D0.01, Part 11:Wireless LAN Medium Access Control (MAC) and Physical Layer (PHY) Specifications, Amendment 7: Enhancements for extremely high throughput (EHT), Jul. 2020, total 33 pages.

Chenchen Liu et al., "EHT NDPA Frame Design Discussion," doc.:IEEE 802.11-20/1015r3, Jul. 2020, total 20 pages.

"Part 11: Wireless LAN Medium Access Control (MAC) and Physical Layer (PHY) Specifications," IEEE Computer Society, IEEE Std 802.11, 2020, 4379 pages.

"Part 11: Wireless LAN Medium Access Control (MAC) and Physical Layer (PHY) Specifications) Amendment 1: Enhancements for High-Efficiency WLAN," IEEE Computer Society, IEEE 802.11ax, 2021, 767 pages.

"Part 11: Wireless LAN Medium Access Control (MAC) and Physical Layer (PHY) Specifications, Amendment 8: Enhancements for extremely high throughput (EHT)," IEEE P802.11be/DE1.0, May 2021, 635 pages.

* cited by examiner

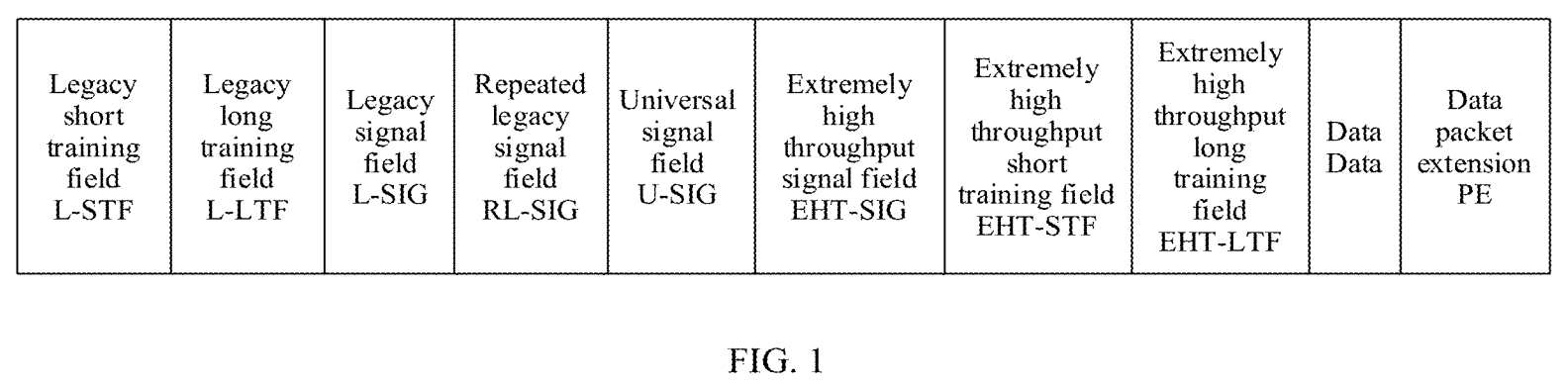

| Legacy short training field L-STF | Legacy long training field L-LTF | Legacy signal field L-SIG | Repeated legacy signal field RL-SIG | Universal signal field U-SIG | Extremely high throughput signal field EHT-SIG | Extremely high throughput short training field EHT-STF | Extremely high throughput long training field EHT-LTF | Data Data | Data packet extension PE |
|---|---|---|---|---|---|---|---|---|---|

FIG. 1

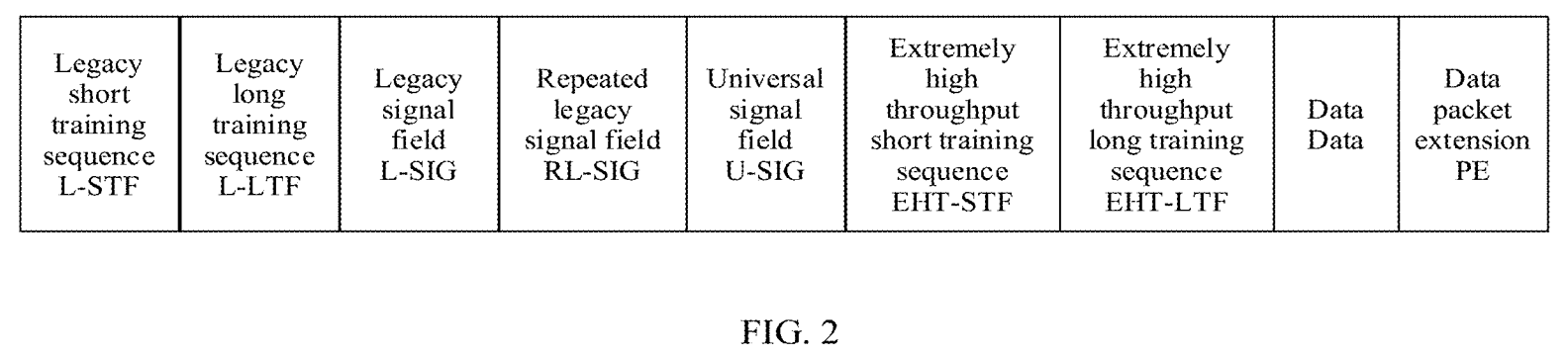

| Legacy short training sequence L-STF | Legacy long training sequence L-LTF | Legacy signal field L-SIG | Repeated legacy signal field RL-SIG | Universal signal field U-SIG | Extremely high throughput short training sequence EHT-STF | Extremely high throughput long training sequence EHT-LTF | Data Data | Data packet extension PE |
|---|---|---|---|---|---|---|---|---|

FIG. 2

Receiving unit 801

Sending unit 802

Receiving unit 901

Measurement unit 903

Sending unit 902

Determining unit 904

COMMUNICATION METHOD, APPARATUS, AND SYSTEM

CROSS-REFERENCE TO RELATED APPLICATIONS

This is a continuation of International Patent Application No. PCT/CN2022/119406 filed on Sep. 16, 2022, which claims priority to Chinese Patent Application No. 202111156203.6 filed on Sep. 29, 2021. The disclosures of the aforementioned applications are hereby incorporated by reference in their entireties.

TECHNICAL FIELD

Embodiments of this disclosure relate to the field of communication technologies, and in particular, to a communication method, apparatus, and system.

BACKGROUND

A link adaptation technology means a system behavior of adaptively adjusting system transmission parameters based on currently obtained channel information, to overcome or adapt to impact brought about by a current channel change. In a wireless local area network (WLAN), an access point (AP) may first perform transmission by using a value of a transmission parameter, and then may adjust the value of the transmission parameter based on information such as whether an acknowledgment (ACK) frame is received for the transmission and a packet error rate of the transmission. In the foregoing method, a plurality of interactions may be required to converge the transmission parameter, which reducing link adaptation efficiency.

SUMMARY

Embodiments of this disclosure disclose a communication method, apparatus, and system, to improve link adaptation efficiency.

According to a first aspect, a communication method is disclosed. The communication method may be applied to a first communication device, or may be applied to a module (for example, a chip) in a first communication device. The following uses an example in which the communication method is applied to the first communication device for description. The first communication device may be an AP, or may be a station (STA). The communication method may include the following.

The first communication device sends a first physical layer protocol data unit (PPDU), where the first PPDU includes indication information and M link adaptation blocks, the indication information indicates a resource used for link adaptation, the M link adaptation blocks use different transmission parameters, the resource is used to transmit the M link adaptation blocks, and M is an integer greater than or equal to 1, and the first communication device receives a feedback result, where the feedback result is determined based on a measurement result corresponding to the M link adaptation blocks.

In this embodiment of this disclosure, the first communication device may send a plurality of link adaptation blocks in one PPDU, and different link adaptation blocks use different transmission parameters. In this case, a second communication device that receives the PPDU can measure the different transmission parameters once, and can return the relatively good feedback result based on the measurement result. The two communication devices may complete link adaptation through one interaction, and do not need to perform a plurality of interactions. Therefore, this can improve link adaptation efficiency. In addition, because a quantity of information transmissions is reduced, a transmission resource can be saved. Further, the PPDU indicates the resource used for link adaptation. Therefore, the second communication device may receive and measure on the indicated resource, and may accurately receive the link adaptation block used for link adaptation. This can improve measurement accuracy, and reduce power consumption of the second communication device.

In a possible implementation, the communication method may further include the following.

The first communication device sends a second PPDU based on the feedback result.

In this embodiment of this disclosure, after receiving the feedback result, the first communication device may send the second PPDU based on the feedback result, so that the second PPDU uses an appropriate transmission parameter, improving system performance.

In a possible implementation, the indication information may be carried in one or more of the following: a first bit, a first user field, a punctured channel information field in a universal signal field (U-SIG), a resource unit (RU) allocation subfield, a bitmap, and a modulation and coding scheme (MCS) index. The first bit may be a validate bit, or may be a disregard bit. The bitmap may be carried in the U-SIG, or may be carried in an Extremely High Throughput (EHT) signal field (EHT-SIG). A STA-ID included in the first user field is a specific STA identifier (ID). The MCS is unavailable in an orthogonal frequency division multiple access (OFDMA) transmission mode.

In this embodiment of this disclosure, the information in the existing PPDU may indicate the resource used for link adaptation, so that a structure of the existing PPDU is not changed. This can improve PPDU compatibility.

In a possible implementation, the bitmap may indicate whether a frequency band indicated by each bit in the bitmap is used for link adaptation or data transmission.

In this embodiment of this disclosure, the bitmap may indicate that the PPDU is used for link adaptation, and indicate the resource used for link adaptation and a resource used for data transmission. It can be learned that a plurality of indications may be implemented by using one bitmap, so that information utilization can be improved.

In a possible implementation, if the resource corresponds to an RU, the first user field is in a user field corresponding to the RU, and the user field corresponding to the RU is located in a content channel corresponding to the RU.

In this embodiment of this disclosure, the first user field is in the user field corresponding to the RU, and the user field corresponding to the RU is located in the content channel corresponding to the RU. Therefore, another user field following the first user field in the user fields corresponding to the RU may be interpreted as a user field used for link adaptation. This can prevent interpreting a user field used for data transmission as the user field used for link adaptation, or interpreting the user field used for link adaptation as a user field used for data transmission.

In a possible implementation, the first user field may further include one or more of spatial stream information, beamforming information, MCS information, feedback type mode information, measurement sequence information, resource allocation information, power information, or measurement accuracy information.

In this embodiment of this disclosure, the first user field may indicate the resource used for link adaptation, and may include common information of different users, improving resource utilization.

In a possible implementation, if the resource corresponds to the RU, and a quantity of user fields corresponding to the RU is greater than 1, a quantity of second user fields corresponding to the RU is a difference between the quantity of user fields corresponding to the RU and a quantity of first user fields corresponding to the RU, and a STA-ID included in the second user field is a STA-ID of a communication device used for link adaptation.

In this embodiment of this disclosure, a user field corresponding to a communication device actually used for link adaptation in the PPDU is the second user field other than the first user field in the user field corresponding to the RU. It should be understood that the specific STA-ID included in the first user field is not a STA-ID, indicating different types of communication devices, that is specified in an existing communication protocol. It may be understood that the STA-ID is a STA-ID that is not defined in the existing protocol.

In a possible implementation, the transmission parameter includes one or more of an MCS, beamforming, a measurement sequence, a spatial stream, and power.

In this embodiment of this disclosure, an appropriate modulation and coding level may be obtained through MCS measurement, an appropriate beam direction may be obtained through beamforming measurement, measurement accuracy and efficiency may be improved through sequence measurement, an appropriate quantity of streams may be obtained through spatial stream measurement, and appropriate transmit power may be obtained through power measurement.

According to a second aspect, a communication method is disclosed. The communication method may be applied to a second communication device, or may be applied to a module (for example, a chip) in a second communication device. The following uses an example in which the communication method is applied to the second communication device for description. The second communication device may be an AP, or a STA. The communication method may include the following.

The second communication device receives a first PPDU, where the first PPDU may include indication information and M link adaptation blocks, the indication information indicates a resource used for link adaptation, the M link adaptation blocks use different transmission parameters, the resource is used to transmit the M link adaptation blocks, and M is an integer greater than or equal to 1, and the second communication device sends a feedback result, where the feedback result is determined based on a measurement result corresponding to the M link adaptation blocks.

In this embodiment of this disclosure, after receiving the PPDU used for link adaptation, the second communication device can measure the different transmission parameters once, and can return the relatively good feedback result based on the measurement result. The two communication devices may complete link adaptation through one interaction, and do not need to perform a plurality of interactions. Therefore, this can improve link adaptation efficiency. In addition, because a quantity of information transmissions is reduced, a transmission resource can be saved. Further, the PPDU indicates the resource used for link adaptation. Therefore, the second communication device may receive and measure on the indicated resource, and may accurately receive the link adaptation block used for link adaptation. This can improve measurement accuracy, and reduce power consumption of the second communication device.

In a possible implementation, the communication method may further include the following.

The second communication device measures the M link adaptation blocks by using the resource, and the second communication device determines the feedback result based on the measurement result.

In this embodiment of this disclosure, the second communication device may first measure the M link adaptation blocks, and then may determine the feedback result based on the measurement result. This can ensure that a transmission parameter fed back is a transmission parameter with relatively good effect, so that the first communication device may subsequently send the PPDU by using the feedback result, improving system performance.

In a possible implementation, the indication information may be carried in one or more of the following: a first bit, a first user field, a punctured channel information field in a U-SIG, an RU allocation subfield, a bitmap, and an MCS index. The first bit may be a validate bit, or may be a disregard bit. The bitmap may be carried in the U-SIG, or may be carried in an EHT-SIG. A STA-ID included in the first user field is a specific STA-ID. The MCS is unavailable in an OFDMA transmission mode.

In this embodiment of this disclosure, the information in the existing PPDU may indicate the resource used for link adaptation, so that a structure of the existing PPDU is not changed. This can improve PPDU compatibility.

In a possible implementation, the bitmap may indicate whether a frequency band indicated by each bit in the bitmap is used for link adaptation or data transmission.

In this embodiment of this disclosure, the bitmap may indicate that the PPDU is used for link adaptation, and indicate the resource used for link adaptation and a resource used for data transmission. It can be learned that a plurality of indications may be implemented by using one bitmap, so that information utilization can be improved.

In a possible implementation, if the resource corresponds to an RU, the first user field is in a user field corresponding to the RU, and the user field corresponding to the RU is located in a content channel corresponding to the RU.

In this embodiment of this disclosure, the first user field is in the user field corresponding to the RU, and the user field corresponding to the RU is located in the content channel corresponding to the RU. Therefore, another user field following the first user field in the user fields corresponding to the RU may be interpreted as a user field used for link adaptation. This can prevent interpreting a user field used for data transmission as the user field used for link adaptation, or interpreting the user field used for link adaptation as a user field used for data transmission.

In a possible implementation, the first user field may further include one or more of spatial stream information, beamforming information, MCS information, feedback type mode information, measurement sequence information, resource allocation information, power information, or measurement accuracy information.

In this embodiment of this disclosure, the first user field may indicate the resource used for link adaptation, and may include common information of different users, improving resource utilization.

In a possible implementation, if the resource corresponds to the RU, and a quantity of user fields corresponding to the RU is greater than 1, a quantity of second user fields corresponding to the RU is a difference between the quantity of user fields corresponding to the RU and a quantity of first user fields corresponding to the RU, and a STA-ID included in the second user field is a STA-ID of a communication device used for link adaptation.

In this embodiment of this disclosure, a user field corresponding to a communication device actually used for link adaptation in the PPDU is the second user field other than the first user field in the user field corresponding to the RU. It should be understood that the specific STA-ID included in the first user field is not a STA-ID corresponding to the communication device.

In a possible implementation, the transmission parameter includes one or more of an MCS, beamforming, a measurement sequence, a spatial stream, and power.

In this embodiment of this disclosure, an appropriate modulation and coding level may be obtained through MCS measurement, an appropriate beam direction may be obtained through beamforming measurement, measurement accuracy and efficiency may be improved through sequence measurement, an appropriate quantity of streams may be obtained through spatial stream measurement, and appropriate transmit power may be obtained through power measurement.

According to a third aspect, a communication method is disclosed. The communication method may be applied to a first communication device, or may be applied to a module (for example, a chip) in a first communication device. The following uses an example in which the communication method is applied to the first communication device for description. The first communication device may be an AP, or a STA. The communication method may include the following.

The first communication device sends a first frame, where the first frame indicates a resource used for link adaptation in a PPDU, and the first communication device sends a first PPDU, where the first PPDU includes M link adaptation blocks, the M link adaptation blocks use different transmission parameters, the resource is used to transmit the M link adaptation blocks, and M is an integer greater than or equal to 1.

In this embodiment of this disclosure, before sending the PPDU, the first communication device may first indicate, by using one frame, that the PPDU is used for link adaptation, and then a plurality of link adaptation blocks may be sent on the PPDU. Different link adaptation blocks use different transmission parameters. In this case, a second communication device that receives the PPDU can measure the different transmission parameters once, and can return the relatively good feedback result based on the measurement result. The two communication devices may complete link adaptation through one interaction, and do not need to perform a plurality of interactions. Therefore, this can improve link adaptation efficiency. In addition, because a quantity of information transmissions is reduced, a transmission resource can be saved. Further, the first frame indicates the resource used for link adaptation. Therefore, the second communication device may receive and measure on the indicated resource, and may accurately receive the link adaptation block used for link adaptation. This can improve measurement accuracy, and reduce power consumption of the second communication device. In addition, the first frame is sent, and then the first PPDU is sent. Therefore, the second communication device may first receive the first frame, so that the second communication device can prepare for measurement based on the first frame before the first PPDU arrives. This can improve measurement efficiency.

In a possible implementation, the communication method may further include the following.

The first communication device receives a feedback result, where the feedback result is determined based on a measurement result corresponding to the M link adaptation blocks, the first communication device sends a second PPDU based on the feedback result, where the second PPDU is used for data transmission.

In this embodiment of this disclosure, after receiving the feedback result, the first communication device may send the second PPDU based on the feedback result, so that the second PPDU uses an appropriate transmission parameter, improving system performance.

In a possible implementation, the first frame may include a STA information field. The station information field may include a partial bandwidth information subfield. The partial bandwidth information subfield may indicate a resource used for link adaptation by a station corresponding to the station information field.

In this embodiment of this disclosure, the first communication device may indicate, by using the partial bandwidth information subfield included in the station information field in the first frame, the resource used for link adaptation by the corresponding station, and may indicate a station that requires link adaptation. In this case, a station that does not require link adaptation does not consider that link adaptation is required.

In a possible implementation, the first frame may include a common field, and the common field indicates a resource used for link adaptation in the PPDU.

In this embodiment of this disclosure, if a plurality of stations all require link adaptation, the common field in the first frame may indicate to reduce a quantity of pieces of indication information, saving a transmission resource and improving information utilization.

In a possible implementation, a resource unit allocation subfield corresponding to the resource in the first PPDU indicates corresponding to 0 user fields.

In this embodiment of this disclosure, if the first frame indicates the resource used for link adaptation in the PPDU, the RU allocation subfield in the PPDU may not provide the indication, that is, the user field corresponding to the RU allocation subfield is 0. This can reduce overheads and new signaling design in the PPDU is not required.

According to a fourth aspect, a communication method is disclosed. The communication method may be applied to a second communication device, or may be applied to a module (for example, a chip) in a second communication device. The following uses an example in which the communication method is applied to the second communication device for description. The second communication device may be an AP, or a STA. The communication method may include the following.

The second communication device receives a first frame, where the first frame indicates a resource used for link adaptation in a PPDU, the second communication device receives a first PPDU, where the first PPDU includes M link adaptation blocks, the M link adaptation blocks use different transmission parameters, the resource is used to transmit the M link adaptation blocks, and M is an integer greater than or equal to 1, and the second communication device sends a feedback result, where the feedback result is determined based on a measurement result corresponding to the M link adaptation blocks.

In this embodiment of this disclosure, after receiving the first frame, the second communication device can measure the different transmission parameters once, and can return the relatively good feedback result based on the measurement result. The two communication devices may complete link adaptation through one interaction, and do not need to perform a plurality of interactions. Therefore, this can improve link adaptation efficiency. In addition, because a quantity of information transmissions is reduced, a transmission resource can be saved. Further, the first frame indicates the resource used for link adaptation. Therefore, the second communication device may receive and measure on the indicated resource, and may accurately receive the link adaptation block used for link adaptation. This can improve measurement accuracy, and reduce power consumption of the second communication device. In addition, the second communication device may first receive the first frame, so that the second communication device can prepare for measurement based on the first frame before the first PPDU arrives. This can improve measurement efficiency.

In a possible implementation, the communication method may further include the following.

The second communication device measures the M link adaptation blocks by using the resource, and the second communication device determines the feedback result based on the measurement result.

In this embodiment of this disclosure, the second communication device may first measure the M link adaptation blocks, and then may determine the feedback result based on the measurement result. This can ensure that a transmission parameter fed back is a transmission parameter with relatively good effect, so that the first communication device may subsequently send the PPDU by using the feedback result, improving system performance.

In a possible implementation, the first frame may include a station information field. The station information field may include a partial bandwidth information subfield. The partial bandwidth information subfield may indicate a resource used for link adaptation by a station corresponding to the station information field.

In this embodiment of this disclosure, the first communication device may indicate, by using the partial bandwidth information subfield included in the station information field in the first frame, the resource used for link adaptation by the corresponding station, and may indicate a station that requires link adaptation. In this case, a station that does not require link adaptation does not consider that link adaptation is required.

In a possible implementation, the first frame may include a common field, and the common field indicates a resource used for link adaptation in the PPDU.

In this embodiment of this disclosure, if a plurality of stations all require link adaptation, the common field in the first frame may indicate to reduce a quantity of pieces of indication information, saving a transmission resource and improving information utilization.

In a possible implementation, a resource unit allocation subfield corresponding to the resource in the first PPDU indicates corresponding to 0 user fields.

In this embodiment of this disclosure, if the first frame indicates the resource used for link adaptation in the PPDU, the RU allocation subfield in the PPDU may not provide the indication, that is, the user field corresponding to the RU allocation subfield is 0. This can reduce overheads and new signaling design in the PPDU is not required.

According to a fifth aspect, a communication apparatus is disclosed. The communication apparatus may be a first communication device or a module (for example, a chip) in a first communication device. The communication apparatus may include a sending unit configured to send a first PPDU, where the first PPDU includes indication information and M link adaptation blocks, the indication information indicates a resource used for link adaptation, the M link adaptation blocks use different transmission parameters, the resource is used to transmit the M link adaptation blocks, and M is an integer greater than or equal to 1, and a receiving unit configured to receive a feedback result, where the feedback result is determined based on a measurement result corresponding to the M link adaptation blocks.

In a possible implementation, the sending unit is further configured to send a second PPDU based on the feedback result.

In a possible implementation, the indication information may be carried in one or more of the following: the first bit, the first user field, the punctured channel information field in the U-SIG, the RU allocation subfield, the bitmap, and the MCS index. The first bit may be a validate bit, or may be a disregard bit. The bitmap may be carried in the U-SIG, or may be carried in an EHT-SIG. A STA-ID included in the first user field is a specific STA-ID. The MCS is unavailable in an OFDMA transmission mode.

In a possible implementation, the bitmap may indicate whether a frequency band indicated by each bit in the bitmap is used for link adaptation or data transmission.

In a possible implementation, if the resource corresponds to an RU, the first user field is in a user field corresponding to the RU, and the user field corresponding to the RU is located in a content channel corresponding to the RU.

In a possible implementation, the first user field may further include one or more of spatial stream information, beamforming information, MCS information, feedback type mode information, measurement sequence information, resource allocation information, power information, or measurement accuracy information.

In a possible implementation, if the resource corresponds to the RU, and a quantity of user fields corresponding to the RU is greater than 1, a quantity of second user fields corresponding to the RU is a difference between the quantity of user fields corresponding to the RU and a quantity of first user fields corresponding to the RU, and a STA-ID included in the second user field is a STA-ID of a communication device used for link adaptation.

In a possible implementation, the transmission parameter includes one or more of an MCS, beamforming, a measurement sequence, a spatial stream, and power.

According to a sixth aspect, a communication apparatus is disclosed. The communication apparatus may be a second communication device, or may be a module (for example, a chip) in a second communication device. The communication apparatus may include a receiving unit configured to receive a first PPDU, where the first PPDU includes indication information and M link adaptation blocks, the indication information indicates a resource used for link adaptation, the M link adaptation blocks use different transmission parameters, the resource is used to transmit the M link adaptation blocks, and M is an integer greater than or equal to 1, and a sending unit configured to send a feedback result, where the feedback result is determined based on a measurement result corresponding to the M link adaptation blocks.

In a possible implementation, the communication apparatus may further include a measurement unit configured to measure the M link adaptation blocks by using the resource, and a determining unit configured to determine the feedback result based on the measurement result.

In a possible implementation, the indication information may be carried in one or more of the following: the first bit, the first user field, the punctured channel information field in the U-SIG, the RU allocation subfield, the bitmap, and the MCS index. The first bit may be a validate bit, or may be a disregard bit. The bitmap may be carried in the U-SIG, or may be carried in an EHT-SIG. A STA-ID included in the first user field is a specific STA-ID. The MCS is unavailable in an OFDMA transmission mode.

In a possible implementation, the bitmap may indicate whether a frequency band indicated by each bit in the bitmap is used for link adaptation or data transmission.

In a possible implementation, if the resource corresponds to an RU, the first user field is in a user field corresponding to the RU, and the user field corresponding to the RU is located in a content channel corresponding to the RU.

In a possible implementation, the first user field may further include one or more of spatial stream information, beamforming information, MCS information, feedback type mode information, measurement sequence information, resource allocation information, power information, or measurement accuracy information.

In a possible implementation, if the resource corresponds to the RU, and a quantity of user fields corresponding to the RU is greater than 1, a quantity of second user fields corresponding to the RU is a difference between the quantity of user fields corresponding to the RU and a quantity of first user fields corresponding to the RU, and a STA-ID included in the second user field is a STA-ID of a communication device used for link adaptation.

In a possible implementation, the transmission parameter includes one or more of an MCS, beamforming, a measurement sequence, a spatial stream, and power.

According to a seventh aspect, a communication apparatus is disclosed. The communication apparatus may be a first communication device or a module (for example, a chip) in a first communication device. The communication apparatus may include a sending unit configured to send a first frame, where the first frame indicates a resource used for link adaptation in a PPDU.

The sending unit is further configured to send a first PPDU, where the first PPDU includes M link adaptation blocks, the M link adaptation blocks use different transmission parameters, the resource is used to transmit the M link adaptation blocks, and M is an integer greater than or equal to 1.

In a possible implementation, the communication apparatus may further include a receiving unit configured to receive a feedback result, where the feedback result is determined based on a measurement result corresponding to the M link adaptation blocks.

The sending unit is further configured to send a second PPDU based on the feedback result, where the second PPDU is used for data transmission.

In a possible implementation, the first frame may include a station information field. The station information field may include a partial bandwidth information subfield. The partial bandwidth information subfield may indicate a resource used for link adaptation by a station corresponding to the station information field.

In a possible implementation, the first frame may include a common field, and the common field indicates a resource used for link adaptation in the PPDU.

In a possible implementation, a resource unit allocation subfield corresponding to the resource in the first PPDU indicates corresponding to 0 user fields.

According to an eighth aspect, a communication apparatus is disclosed. The communication apparatus may be a second communication device or a module (for example, a chip) in a second communication device. The communication apparatus may include a receiving unit configured to receive a first frame, where the first frame indicates a resource used for link adaptation in a PPDU, where the receiving unit is further configured to receive a first PPDU, where the first PPDU includes M link adaptation blocks, the M link adaptation blocks use different transmission parameters, the resource is used to transmit the M link adaptation blocks, and M is an integer greater than or equal to 1, and a sending unit configured to send a feedback result, where the feedback result is determined based on a measurement result corresponding to the M link adaptation blocks.

In a possible implementation, the communication apparatus may further include a measurement unit configured to measure the M link adaptation blocks by using the resource, and a determining unit configured to determine the feedback result based on the measurement result.

In a possible implementation, the first frame may include a station information field. The station information field may include a partial bandwidth information subfield. The partial bandwidth information subfield may indicate a resource used for link adaptation by a station corresponding to the station information field.

In a possible implementation, the first frame may include a common field, and the common field indicates a resource used for link adaptation in the PPDU.

In a possible implementation, a resource unit allocation subfield corresponding to the resource in the first PPDU indicates corresponding to 0 user fields.

According to a ninth aspect, a communication apparatus is disclosed. The communication apparatus may include a processor configured to enable the communication apparatus to perform the communication method disclosed in any one of the first aspect or the implementations of the first aspect, or configured to enable the communication apparatus to perform the communication method disclosed in any one of the third aspect or the implementations of the third aspect. Optionally, the communication apparatus may further include a memory and/or a transceiver. The transceiver is configured to receive information from another communication apparatus other than the communication apparatus, and output information to the other communication apparatus other than the communication apparatus. When the processor executes a computer program stored in the memory, the processor is enabled to perform the communication method disclosed in any one of the first aspect or the implementations of the first aspect, or the processor is enabled to perform the communication method disclosed in any one of the first aspect or the implementations of the first aspect.

A tenth aspect discloses a communication apparatus. The communication apparatus may include a processor configured to enable the communication apparatus to perform the communication method disclosed in any one of the second aspect or the implementations of the second aspect, or configured to enable the communication apparatus to perform the communication method disclosed in any one of the fourth aspect or the implementations of the fourth aspect. Optionally, the communication apparatus may further include a memory and/or a transceiver. The transceiver is configured to receive information from another communication apparatus other than the communication apparatus, and output information to the other communication apparatus other than the communication apparatus. When the processor executes a computer program stored in the memory, the processor is enabled to perform the communication method disclosed in any one of the second aspect or the implementations of the second aspect, or the processor is enabled to perform the communication method disclosed in any one of the fourth aspect or the implementations of the fourth aspect.

According to an eleventh aspect, a communication system is disclosed. The communication system includes the communication apparatus according to the ninth aspect and the communication apparatus according to the tenth aspect.

According to a twelfth aspect, a computer-readable storage medium is disclosed. The computer-readable storage medium stores a computer program or computer instructions. When the computer program or the computer instructions are run, the communication method disclosed in the foregoing aspects is performed.

According to a thirteenth aspect, a chip is disclosed. The chip includes a processor configured to execute a program stored in a memory. When the program is executed, the chip is enabled to perform the foregoing method.

In a possible implementation, the memory is located outside the chip.

According to a fourteenth aspect, a computer program product is disclosed. The computer program product includes computer program code, and when the computer program code is run, the foregoing communication method is performed.

BRIEF DESCRIPTION OF DRAWINGS

FIG. 1 is a schematic diagram of a multi-user (MU) PPDU according to an embodiment of this disclosure;

FIG. 2 is a schematic diagram of a trigger-based (TB) PPDU according to an embodiment of this disclosure;

DESCRIPTION OF EMBODIMENTS

Figure 3:
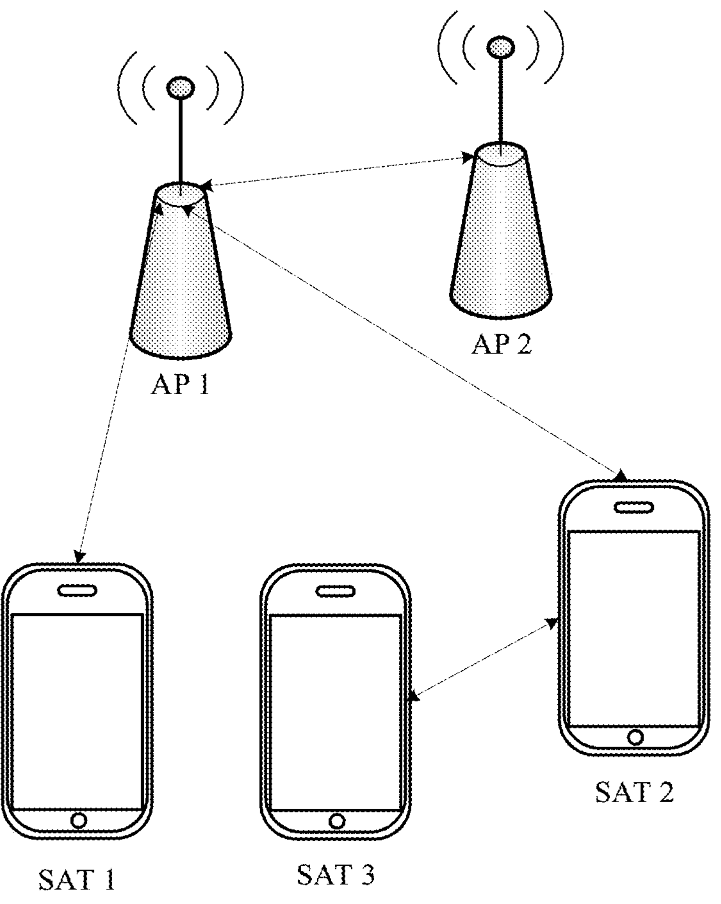
FIG. 3 is a schematic diagram of a network architecture according to an embodiment of this disclosure.

Embodiments of this disclosure disclose a communication method, apparatus, and system, to improve link adaptation efficiency. Details are separately described in the following.

The following first describes related technologies in embodiments of this disclosure, to better understand embodiments of this disclosure.

WLAN has been developed for a plurality of generations, such as the 802.11a/b/g, 802.11n, 802.11ac, 802.11ax, and the 802.11be under discussion. The 802.11n standard may be referred to as a high throughput (HT), the 802.11ac standard may be referred to as a very high throughput (VHT), the 802.11ax (WI-FI 6) may be referred to as a high efficiency (HE), the 802.11be (WI-FI 7) may be referred to as an EHT, and standards before the HT, such as the 802.11a/b/g, may be collectively referred to as a non-high throughput (Non-HT).

In the WLAN, a physical layer may transmit information through a PPDU. An uplink/downlink field and a PPDU type and compression mode field of an EHT PPDU may be shown in Table 1:

TABLE 1

| U-SIG | | Description | | | | |
|---|---|---|---|---|---|---|
| Uplink/ Downlink | PPDU type and compression mode | EHT PPDU format | Whether an EHT-SIG exists | Whether a resource unit allocation subfield exists | Quantity of total user fields | Note |
| 0 (DL) | 0 | EHT MU | Yes | Yes | ≥1 | Downlink OFDMA (including non-MU-MIMO and MU-MIMO) |
| | 1 | EHT MU | Yes | No | Single-user transmission is denoted by 1. Null data packet (NDP) transmission is denoted by 0 | Used for single-user transmission or NDP transmission |
| | 2 | EHT MU | Yes | No | >1 | DL MU-MIMO (non-OFDMA) |
| | 3 | — | — | — | — | Reserved |
| 1 (UL) | 0 | EHT TB | No | — | ≥1 | Uplink OFDMA or uplink non-OFDMA (including |

TABLE 1-continued

| U-SIG | | Description | | | | |
|---|---|---|---|---|---|---|
| Uplink/ Downlink | PPDU type and compression mode | EHT PPDU format | Whether an EHT-SIG exists | Whether a resource unit allocation subfield exists | Quantity of total user fields | Note |
| | | | | | | non-MU-MIMO and MU-MIMO) |
| | 1 | EHT MU | Yes | No | Single-user transmission is denoted by 1. NDP transmission is denoted by 0 | Used for single-user transmission or NDP transmission |
| | 2 to 3 | — | — | — | — | Reserved |

It can be learned from Table 1 that both the format and a compression mode of the EHT PPDU may be determined based on the uplink/downlink field, the PPDU type and compression mode field. It can be learned that the format of the EHT PPDU may be an MU PPDU, or may be a TB PPDU. FIG. 1 is a schematic diagram of an MU PPDU according to an embodiment of this disclosure. As shown in FIG. 1, the MU PPDU may include a legacy short training field (L-STF), a legacy long training field (L-LTF), a legacy signal field (L-SIG), a repeated legacy signal field (RL-SIG), a U-SIG, an EHT-SIG, an EHT short training field (EHT-STF), an EHT long training field (EHT-LTF), a data, and a data packet extension (PE). FIG. 2 is a schematic diagram of a TB PPDU according to an embodiment of this disclosure. As shown in FIG. 2, the TB PPDU may include an L-STF, an L-LTF, an L-SIG, an RL-SIG, a U-SIG, an EHT-STF, an EHT-LTF, a data, and a PE. It can be learned that, if the format of the EHT PPDU is the TB PPDU, the EHT-SIG does not exist in the TB PPDU. The EHT-SIG may include a common field and a user-specific field. The common field may include a resource unit (RU) allocation subfield, and the user-specific field may include a user field. The resource unit allocation subfield indicates tone plan. It can be learned from Table 1, FIG. 1 and FIG. 2 that the resource unit allocation subfield may exist or may not exist.

If the resource unit allocation subfield exists, that is, the EHT-SIG exists, one resource unit allocation subfield may correspond to a frequency band with a bandwidth of 20 megahertz (MHz). For example, if a bandwidth of a PPDU is 20 MHz, the EHT-SIG may include one resource unit allocation subfield. For another example, if a bandwidth of a PPDU is 40 MHz, the EHT-SIG may include two resource unit allocation subfields, which may respectively indicate two 20 MHz frequency bands in an ascending order of frequencies. For another example, if a bandwidth of a PPDU is 160 MHz, the EHT-SIG may include eight resource unit allocation subfields, which may respectively indicate eight 20 MHz frequency bands in an ascending order of frequencies. For another example, if a bandwidth of a PPDU is 320 MHz, the EHT-SIG may include 16 resource unit allocation subfields, which may respectively indicate 16 20 MHz frequency bands in an ascending order of frequencies.

If the resource unit allocation subfield exists, and the bandwidth of the PPDU is 20 MHz, the EHT-SIG may be carried on a content channel (CC) for transmission. If the bandwidth of the PPDU is greater than or equal to 40 MHZ, the EHT-SIG may be carried on two CCs for parallel transmission, so that the EHT-SIG can be transmitted more quickly. For example, if the bandwidth of the PPDU is 160 MHz, a CC1 may carry a first, third, fifth, and seventh 20 MHz frequency band identified in an ascending order of frequencies, and a CC2 may carry a second, fourth, sixth, and eighth 20 MHz frequency band identified in an ascending order of frequencies.

For each resource unit allocation subfield, 9 bits may be used in the EHT to indicate a carried resource unit. The resource unit allocation subfield indicates an allocation status of a resource unit on a corresponding 20 MHz frequency band and a location of the resource unit in a frequency. In addition, the resource unit allocation subfield further indicates a quantity of user fields that the resource unit allocation subfield contributes to a corresponding content channel of the resource unit allocation subfield. If more than one user field belongs to a same resource unit, these user fields are MU-multiple-input multiple-output (MIMO) user fields, indicating that users on the RU perform a MU-MIMO operation.

If a quantity of subcarriers included in the resource unit is less than 242, that is, the resource unit is a small size RU, each resource unit can support only one user. If a quantity of subcarriers included in the resource unit is greater than or equal to 242, that is, the resource unit is a large size RU, each resource unit may support a maximum of eight users. A total quantity of users may be obtained by summing up quantities of user fields indicated by resource unit allocation subfields corresponding to all 20 MHz frequency bands corresponding to the resource unit. For example, if the resource unit includes 242 subcarriers, the resource unit corresponds to only one resource unit allocation subfield, and a quantity of user fields corresponding to the resource unit allocation subfield is a quantity of MU-MIMO users.

It should be noted that an order of user fields in the user-specific field is the same as an order of RUs divided from a corresponding resource unit allocation subfield, and a user may read the STA-ID in the user field, to identify whether the user field belongs to the user. The user may learn of an RU allocation status of the user with reference to a location of the user field and the corresponding resource unit allocation subfield. The user herein may be a STA, or may be an AP.

If the resource unit allocation subfield does not exist and non-NDP transmission is performed, the PPDU may indicate resource unit allocation by using a punctured channel information field in the U-SIG.

If the resource unit allocation subfield does not exist and NDP transmission is performed, a frequency band to be measured by a corresponding station may be indicated by using a partial bandwidth information (Partial BW Info) subfield in a station information field in an NDP announcement (NDPA) frame before an NDP, to subsequently feed back a compressed beamforming/channel quality indicator frame. Because there is no data field in the NDP, it may be considered that there is no resource unit that is allocated to a specific station to carry data. The allocated resource unit herein may be understood as an announced location corresponding to a frequency band to be measured by a corresponding station.

A link adaptation technology means a system behavior of adaptively adjusting system transmission parameters based on currently obtained channel information, to overcome or adapt to impact brought about by a current channel change. In the WLAN, the AP may tentatively adjust the transmission parameter, and perform transmission by using the adjusted transmission parameter, and then correct the transmission parameter based on information such as whether an ACK frame is received for the transmission, and a packet error rate of the transmission.

The following uses an example in which the transmission parameter is an MCS for description. The AP can tentatively adjust the MCS, and then adjust an MCS size based on the information such as whether the ACK frame is received and the packet error rate. For example, if transmission is always successful, an MCS level may be increased in subsequent transmission, to enhance a transmission rate. If a transmission failure occurs, an MCS level may be decreased in subsequent transmission, to enhance a transmission rate.

In the foregoing method, a plurality of interactions may be required to converge the transmission parameter, resulting in reduction of link adaptation efficiency.

To better understand a communication method, apparatus, and system according to embodiments of this disclosure, the following first describes a network architecture used for embodiments of this disclosure. FIG. 3 is a schematic diagram of a network architecture according to an embodiment of this disclosure. The network structure may include one or more access point (AP) stations and one or more non-AP STA. For ease of description, an access point station is referred to as an access point (AP), and a non-access point station is referred to as a station (STA) in this specification. The access point may be an access point used by a terminal device (such as a mobile phone) to access a wired (or wireless) network, and is mainly deployed at home, in a building, and in a park. A typical coverage radius is tens of meters to 100-odd meters. Certainly, the access point may alternatively be deployed outdoors. The access point is equivalent to a bridge that connects the wired network and the wireless network. A main function of the access point is to connect various wireless network clients together and then connect the wireless network to the Ethernet. Further, the access point may be a terminal device (such as a mobile phone) or a network device (such as a router) with a WI-FI chip. The access point may be a device supporting the 802.11be standard. Alternatively, the access point may be a device that supports a plurality of WLAN standards of the 802.11 family such as the 802.11ax, the 802.11ac, the 802.11n, the 802.11g, the 802.11b, the 802.11a, and a next generation of the 802.11be. The access point in this disclosure may be a high efficiency (HE) AP, an EHT AP, or an access point applicable to a future-generation WI-FI standard.

The station may be a wireless communication chip, a wireless sensor, a wireless communication terminal, or the like, and may also be referred to as a user. For example, the station may be a mobile phone, a tablet computer, a set-top box, a smart television set, a smart wearable device, a vehicle-mounted communication device, a computer, or the like that supports a WI-FI communication function. Optionally, the station may support the 802.11be standard. Alternatively, the station may support a plurality of WLAN standards of the 802.11 family such as 802.11ax, 802.11ac, 802.11n, 802.11g, 802.11b, 802.11a, and a next generation of the 802.11be.

The access point in this disclosure may be a high efficiency (HE) STA, an EHT STA, or a STA applicable to a future-generation WI-FI standard.

For example, the access point and the station may be devices used in the internet of vehicles, internet of things nodes, sensors, or the like in the Internet of things (IoT), smart cameras, smart remote controls, smart water or electricity meters, or the like in smart home, sensors in smart city, and the like.

It should be noted that the network architecture shown in FIG. 3 is not limited to including only the AP and the STA in the figure, and may further include another AP and STA that are not shown in the figure. This is not enumerated in this disclosure.

An embodiment of this disclosure provides a communication method applied to a wireless communication system. The wireless communication system may be a WLAN or a cellular network. The method may be implemented by a communication device in the wireless communication system, or implemented by a chip or a processor in the communication device. The communication device may be a wireless communication device that supports parallel transmission on multiple links. For example, the communication device is referred to as a multi-link device or a multi-band device. Compared with a device that supports only single-link transmission, the multi-link device has higher transmission efficiency and a higher throughput.

The multi-link device includes one or more affiliated STAs. The affiliated STA is a logical station and may operate on one link. The affiliated station may be an access point (AP) or a non-AP STA. For ease of description, in this disclosure, a multi-link device whose affiliated station is an AP may be referred to as a multi-link AP, an AP multi-link device, or an AP multi-link device. A multi-link device whose affiliated station is a non-AP STA may be referred to as a multi-link STA, a STA multi-link device, or a STA multi-link device.

Figure 4:
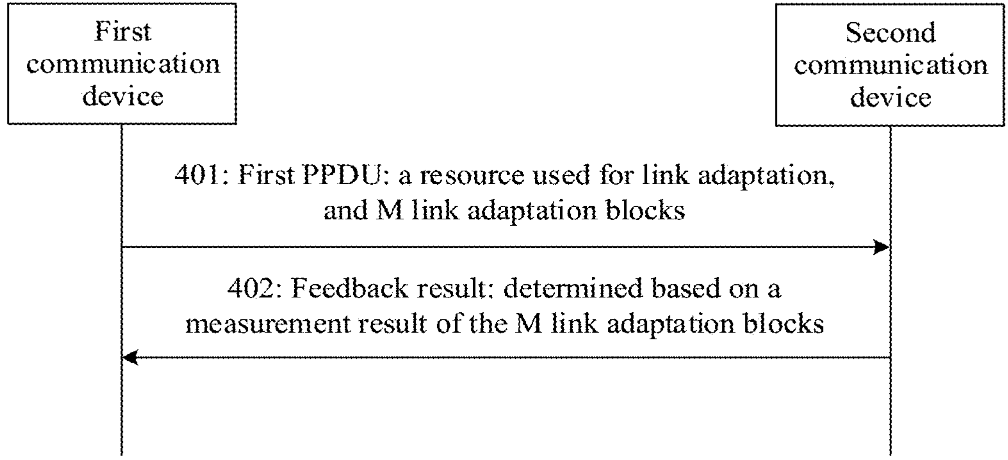
FIG. 4 is a schematic flowchart of a communication method according to an embodiment of this disclosure.

Based on the foregoing network architecture, FIG. 4 is a schematic flowchart of a communication method according to an embodiment of this disclosure. As shown in FIG. 4, the communication method may include the following steps.

401: A first communication device sends a first PPDU to a second communication device.

Correspondingly, the second communication device receives the first PPDU from the first communication device.

If the first communication device needs to perform link adaptation, the first communication device may send the first PPDU to the second communication device. The first PPDU may include indication information and M link adaptation blocks. The indication information may indicate a resource used for link adaptation, and the resource is used to transmit the M link adaptation blocks. In other words, the indication information may indicate the resource used to transmit the M link adaptation blocks. The resource may be understood as a frequency domain resource, and may correspond to an RU (namely, a single RU), a frequency band, a multiple resource unit (MRU), or another resource. The resource used for link adaptation may be understood as an RU used for link adaptation, a frequency band used for link adaptation, or an MRU used for link adaptation.

If the resource corresponds to the RU, the resource may include one RU, or may include a plurality of RUs. The resource corresponding to the RU may be understood as a resource in a unit of an RU. The RU may be a 26-tone RU, a 52-tone RU, a 106-tone RU, a 242-tone RU, a 484-tone RU, a 996-tone RU, or an RU of another tone.

If the resource corresponds to the frequency band, the resource may include one frequency band, or may include a plurality of frequency bands. The resource corresponding to the frequency band may be understood as a resource in a unit of a frequency band. The frequency band may be of 20 MHz, 40 MHz, 80 MHz, another integer multiple of 20 MHZ, or another MHz.

If the resource corresponds to the MRU, the resource may include one MRU, or may include a plurality of MRUs. The resource corresponding to the MRU may be understood as a resource in a unit of an MRU. The MRU may be a 52+26-tone MRU, a 106+26-tone MRU, or an MRU including two or more other tones.

The indication information may be one or more of a first bit, a first user field, a punctured channel information field in a U-SIG, a resource unit allocation subfield, a bitmap, and an MCS index.

The first bit may be a validate bit, and the validate bit belongs to a reserved bit. In an existing protocol, after it is found that validate bits are inconsistent, subsequent interpretation may stop. However, in this disclosure, after it is found that the validate bits are inconsistent, subsequent interpretation may stop, and the first PPDU may be indicated to be used for link adaptation. Alternatively, the first bit may be a disregard bit. Regardless of whether a value of the disregard bit is 0 or 1, interpretation continues, in other words, the disregard bit is ignored. When the first bit is located in the disregard bit, a disregard bit defined in an original protocol may indicate that the first PPDU is used for link adaptation. For example, when the bit is 0, it indicates that the first PPDU is used for link adaptation, or when the bit is 1, it indicates that the first PPDU is used for link adaptation. The first bit may be carried in the U-SIG, an EHT-SIG, or another part of the first PPDU. For example, the first bit may be carried in an L-SIG.

Each of the first user field and a second user field is a user field, and includes a STA-ID. However, a STA-ID included in the first user field is a specific STA-ID. The specific STA-ID is not a STA-ID indicating different types of communication devices (namely, users) that is specified in an existing communication protocol. It may be understood that the STA-ID is a STA-ID that is not defined in the existing protocol. A STA-ID included in the second user field is a STA-ID of a communication device (namely, a user) used for link adaptation, in other words, the STA-ID included in the second user field is the STA-ID of the communication device, and the communication device is a communication device used for link adaptation. The STA-ID may include 11 bits, and may be a value ranging from 0 to 2047. Because 0, 2045, 2046, and 2047 already have unique meanings, the specific STA-ID may be a value ranging from 1 to 2044.

It should be understood that both the first user field and the second user field are user fields corresponding to the foregoing resource.

If the resource corresponds to the RU, the first user field may be located in a user field corresponding to the RU. The user field corresponding to the RU may be located on a content channel corresponding to the RU. A user field corresponding to one RU included in the resource may include one first user field, or may include a plurality of first user fields. If the user field corresponding to one RU includes one first user field, the first user field may be located in a 1$^{st}$ user field in the user field corresponding to the RU, or a last user field in the user field corresponding to the RU, or another location in the user field corresponding to the RU, for example, an intermediate user field in the user field corresponding to the RU. If the user field corresponding to one RU includes the plurality of first user fields, the plurality of first user fields may be contiguous, that is, adjacent, or non-contiguous. There may be one or more content channels corresponding to the RU.

In addition, to improve resource utilization, the first user field may further include common information required by a link adaptation user. Similarly, the second user field may further include configuration information used for link adaptation by a single user. It can be learned that the common information included in the first user field may be used for link adaptation by a plurality of users, and the configuration information included in the second user field can be used for link adaptation by only one user. Each of the common information in the first user field and the configuration information in the second user field may include one or more of spatial stream information, beamforming information, MCS information, feedback type mode information, measurement sequence information, resource allocation information, power information, or measurement accuracy information. The spatial stream information may include start locations, a quantity, and the like of spatial streams. The beamforming information may include weight matrix information, and the like. The MCS information may include MCS configuration. The feedback type mode information may include information to be fed back. The resource allocation information may include information about an allocated resource. The power information may include information about power used for link adaptation. The measurement accuracy information may include a range of a feedback result, and the like. For example, the first user field may carry common configuration of an MCS, and a second user field corresponding to the second communication device may carry an MCS range measured by the second communication device, an MCS range fed back by the second communication device, and the like.

For example, if the user field includes the MCS information, the user field may be shown in Table 2.

TABLE 2

| Bits | Subfield | Quantity of bits | Description |
|---|---|---|---|
| B0 to B10 | STA-ID | 11 | Station identifier information, indicating a station corresponding to a user field |
| B11 to B14 | MCS start | 4 | Indicate an initial MCS index for measurement |
| B15 to B18 | MCS end | 4 | Indicates an ending MCS index for measurement |
| B19 to B21 | Granularity | 3 | Indicate a step size increase in an MCS index after the initial MCS index in each measurement |

It should be understood that Table 2 merely describes the user fields an example, and does not constitute a limitation on the user field. If a longer user field is required, user fields can be combined to add information. For example, two same STA-IDs indicate that a subsequent user field still belongs to the user. In this case, a total of (22−11)*2=22 bits may be used for MCS indication, and may be used for a more flexible MCS measurement indication. An MCS used by a subsequent link adaptation block may be indicated by using an MCS bitmap. 16 bits may indicate an MCS used for link adaptation. The 16 bits may sequentially indicate usage statuses of 16 MCSs 0 to 15 in Table 3 from left to right. For example, when a value of the 16 bits is 1110001000000000, and there are four link adaptation blocks, if 1 indicates being used for link adaptation, it can indicate that MCS indexes of the four link adaptation blocks used for link adaptation are 0, 1, 2, and 6 respectively. Similarly, the 16 bits may alternatively sequentially indicate usage statuses of 16 MCSs 0 to 15 in Table 3 from right to left. For example, when a value of the 16 bits is 1110001000000000, and there are four link adaptation blocks, if 1 indicates being used for link adaptation, it can indicate that MCS indexes of the four link adaptation blocks used for link adaptation are 9, 13, 14, and 15 respectively. In addition, for MCS adjustment, indication information indicating a size of a resource occupied by one link adaptation block may be further carried. For example, the indication information may indicate that each link adaptation block occupies n orthogonal frequency division multiplexing (OFDM) symbols.

The following uses beamforming as an example. In this case, different beamforming may be performed on different link adaptation blocks, and the second communication device may feed back a specific link adaptation block having good receiving effect. For another example, a perspective of power is considered. The link adaptation block may include a plurality of streams, and power allocated to each stream in different link adaptation blocks may be different. Similarly, the station may feed back a specific link adaptation block having good receiving effect.

The bitmap is a bit sequence including a plurality of bits. The bitmap may be located (or carried) in the U-SIG, the EHT-SIG, or another part of the PPDU. If the first PPDU is used for both link adaptation and data transmission, the bitmap indicates that a frequency band indicated by each bit in the bitmap is used for link adaptation or data transmission. In other words, the bitmap may indicate a frequency band used for link adaptation, and indicate a frequency band used for data transmission. For example, the bitmap may include 16 bits. If a bandwidth of the first PPDU is 20 MHz, only a first bit in the 16 bits may be a valid bit. If a bandwidth of the first PPDU is 40 MHz, only first two bits in the 16 bits are valid bits. If a bandwidth of the first PPDU is 80 MHZ, only first four bits in the 16 bits may be valid bits. It can be learned that one bit in the bitmap may correspond to a 20 MHz frequency band. For example, if a value of the valid bit is 0, the valid bit may indicate that a frequency band corresponding to the valid bit is used for link adaptation, and if a value of the valid bit is 1, the valid bit may indicate that a frequency band corresponding to the valid bit is used for data transmission. For another example, if a value of the valid bit is 1, the valid bit may indicate that a frequency band corresponding to the valid bit is used for link adaptation, and if a value of the valid bit is 0, the valid bit may indicate that a frequency band corresponding to the valid bit is used for data transmission. If the first PPDU is used only for link adaptation, the bitmap may indicate a frequency band used for link adaptation. For example, if values of all valid bits in the bitmap are 0 (or 1), the bitmap may indicate that the first PPDU is used only for link adaptation. It should be understood that, the foregoing is merely an example description of the bitmap, and constitutes no limitation on the bitmap. For example, one bit in the bitmap may correspond to a 40 MHz frequency band, an 80 MHz frequency band, or another frequency band of an integer multiple of 20 MHz. For another example, the bitmap may include two bits, three bits, four bits, or another quantity of bits.

In some cases, some MCSs are unavailable. Therefore, MCS indexes may be used in the user field for indication. An MCS in the EHT may be shown in Table 3:

TABLE 3

| MCS index | Modulation scheme | Bit rate | Description |
|---|---|---|---|
| 0 | Binary phase shift keying (BPSK) | 1/2 | |
| 1 | Quadrature phase shift keying (QPSK) | 1/2 | |
| 2 | QPSK | 3/4 | |
| 3 | 16-quadrature amplitude modulation (QAM) | 1/2 | |
| 4 | 16-QAM | 3/4 | |
| 5 | 64-QAM | 2/3 | |
| 6 | 64-QAM | 3/4 | |
| 7 | 64-QAM | 5/6 | |
| 8 | 256-QAM | 3/4 | |
| 9 | 256-QAM | 5/6 | |
| 10 | 1024-QAM | 3/4 | |
| 11 | 1024-QAM | 5/6 | |
| 12 | 4096-QAM | 3/4 | |
| 13 | 4096-QAM | 5/6 | |
| 14 | BPSK + dual carrier modulation (DCM) + duplicate mode (DUP) | 1/2 | Applicable to a PPDU in EHT single-user duplicate mode in a 6 GHz frequency band |
| 15 | BPSK + DCM | 1/2 | |

For example, in an OFDMA mode, the MCS may be MCS14.

As shown in Table 1, in the U-SIG field included in the first PPDU, if the uplink/downlink field is 0, and the PPDU type and compression mode field is 1, a transmission mode of the first PPDU may be a single-user transmission mode. In the U-SIG field included in the first PPDU, if the uplink/downlink field is 1, and the PPDU type and compression mode field is 1, a transmission mode of the first PPDU may be a single-user transmission mode. In the U-SIG field included in the first PPDU, if the uplink/downlink field is 0, the PPDU type and compression mode field is 0, and the quantity of total user fields is 1, a transmission mode of the first PPDU may be a single-user transmission mode. If the transmission mode of the first PPDU is the single-user transmission mode, the first PPDU includes only one user field. If the transmission mode of the first PPDU is the single-user transmission mode, and the first PPDU is used only for link adaptation, the user field is the second user field. The resource corresponds to the user field, that is, the resource is a resource used for link adaptation by a user corresponding to the user field. An original type of the user field is a non-MU-MIMO type. However, the indication information indicates the resource used for link adaptation, that is, indicates that the user corresponding to the user field performs link adaptation. Therefore, the type of the user field changes from the non-MU-MIMO type to a link adaptation type. Therefore, the second communication device may interpret the user field based on the link adaptation type. In this case, the indication information has the following several cases.

In one case, the indication information may be the punctured channel information field in the U-SIG. For example, if the punctured channel information field in the U-SIG is a first value, the punctured channel information field in the U-SIG may indicate the resource used for link adaptation, which may be understood as that the first PPDU is used for link adaptation, and a resource indicated by the first PPDU is the resource used for link adaptation. If a SAT-ID of the communication device that receives the first PPDU is the same as the STA-ID included in the user field, and the communication device interprets the punctured channel information field in the U-SIG as the first value, the second communication device may perform link adaptation by using the resource indicated by the indication information.

In another case, the indication information may be the first bit. The first bit may indicate the resource used for link adaptation, which may be understood as that the first PPDU is used for link adaptation, and a resource indicated by the first PPDU is the resource used for link adaptation. For example, if the first bit is 1, the first bit may indicate the resource used for link adaptation. For another example, if the first bit is 0, the first bit may indicate the resource used for link adaptation. It can be learned that one bit may indicate that the first PPDU is used for link adaptation, and the resource indicated by the first PPDU is the resource used for link adaptation.

In still another case, the indication information may alternatively be the punctured channel information field in the U-SIG and the first bit. For example, if the punctured channel information field in the U-SIG is a second value, and the first bit is 1 (or 0), the resource used for link adaptation may be indicated.

The first PPDU may be sent in a broadcast manner. In this case, the indication information may be the first user field. If the transmission mode of the first PPDU is the single-user transmission mode and the first PPDU is used only for link adaptation, all second communication devices that can receive the first PPDU may perform step 402 based on the first PPDU. If the transmission mode of the first PPDU is MU MIMO, and the first PPDU is used for both link adaptation and data transmission, in one case, a second communication device, to which no data is allocated, in the second communication devices that can receive the first PPDU may perform step 402 based on the first PPDU, in another case, a second communication device, in the second communication devices that can receive the first PPDU, other than a second communication device that is specified to perform link adaptation on a specific resource unit, may perform step 402 based on the first PPDU.

As shown in Table 1, in the U-SIG field included in the first PPDU, if the uplink/downlink field is 0, and the PPDU type and compression mode field is 0 or 2, the transmission mode of the first PPDU may be the MU MIMO transmission mode. If the transmission mode of the first PPDU is the MU MIMO transmission mode, the first PPDU may include a plurality of user fields. If the transmission mode of the first PPDU is the MU MIMO transmission mode, and the first PPDU is used only for link adaptation, the resource corresponds to the plurality of user fields. If the first PPDU does not include the first user field, the plurality of user fields are second user fields. If the first PPDU includes the first user field, a user field other than the first user field in the plurality of user fields is the second user field. An original type of the second user field is a MU-MIMO type. However, the indication information indicates the resource used for link adaptation, that is, indicates that a user corresponding to the second user field is used for link adaptation. Therefore, the type of the second user field changes from the MU-MIMO type to a link adaptation type. In this case, the indication information has the following several cases.

In one case, the indication information may be the punctured channel information field in the U-SIG. In another case, the indication information may be the first bit. In still another case, the indication information may be the punctured channel information field in the U-SIG and the first bit. For detailed descriptions of these cases, refer to the foregoing related descriptions.

In still another case, the indication information may be the first user field. The first user field may indicate that the first PPDU is used for link adaptation, and the resource indicated by the first PPDU is the resource used for link adaptation. For example, if the second communication device detects that the first PPDU includes both the second user field corresponding to the second communication device and the first user field, the second communication device may perform step 402 based on the second user field corresponding to the second communication device and an RU corresponding to the second communication device.

In still another case, the indication information may be the first user field and the punctured channel information field in the U-SIG. For example, if the first PPDU includes the first user field, and the punctured channel information field in the U-SIG is a third value, the first user field and the punctured channel information field in the U-SIG may indicate the resource used for link adaptation.

It should be understood that, if the punctured channel information field in the U-SIG includes 5 bits, the first value, the second value, and the third value may be values 0 to 31. A channel puncturing pattern indicated by a punctured channel information field in a U-SIG in the existing protocol may be reused, and link adaptation in the channel puncturing pattern is indicated. It may be understood that the channel puncturing pattern herein may be considered as an indication of the resource for link adaptation.

In still another case, the indication information may alternatively be the first bit and the first user field. For example, if the first PPDU includes the first user field, and a bit corresponding to the first bit is 1 (or 0), the first bit and the first user field may indicate the resource used for link adaptation.

In still another case, the indication information may be the MCS index. For example, if the MCS index is a fourth value, the MCS index may indicate the resource used for link adaptation. In still another case, the indication information may be the MCS index and the punctured channel information field in the U-SIG. In still another case, the indication information may be the MCS index and the first bit. In still another case, the indication information may be the MCS index and the first user field. In still another case, the indication information may be the punctured channel information field in the U-SIG, the first bit, and the first user field. In still another case, the indication information may be the punctured channel information field, the first bit, and the MCS index. In still another case, the indication information may be the first bit, the first user field, and the MCS index. In still another case, the indication information may be the punctured channel information field, the first user field, and the MCS index.

As shown in Table 1, in the U-SIG field included in the first PPDU, if the uplink/downlink field is 0, and the PPDU type and compression mode field is 0, the transmission mode of the first PPDU may be the OFDMA transmission mode. If the transmission mode of the first PPDU is the OFDMA transmission mode, the first PPDU may include one user field, or may include a plurality of user fields. If the transmission mode of the first PPDU is the OFDMA transmission mode, and the first PPDU is used for both link adaptation and data transmission, the resource may correspond to one user field, or may correspond to a plurality of user fields. If the first PPDU does not include the first user field, user fields corresponding to the resource are the second user fields. If the first PPDU includes the first user field, a user field other than the first user field in the user fields corresponding to the resource is the second user field. The original type of the second user field is the non-MU-MIMO type or the MU MIMO type. However, the indication information indicates the resource used for link adaptation, the type of the second user field is changed from the non-MU-MIMO type or the MU MIMO type to the link adaptation type. In this case, the indication information has the following several cases.

In one case, the indication information may be the bitmap. The bitmap may indicate whether a frequency band indicated by each bit in the bitmap is used for link adaptation or data transmission. For detailed descriptions, refer to the related descriptions of the bitmap.

In another case, the indication information may be the first user field. The first user field may indicate that the first PPDU is used for link adaptation, and may indicate that an RU corresponding to the first user field is the resource used for link adaptation. It should be understood that a user field other than the first user field in the user field corresponding to the RU corresponding to the first user field is the second user field. For example, if the RU corresponding to the first user field corresponds to two user fields, one of the two user fields is the first user field, and indicates that the RU is used for link adaptation, and the other of the two user fields is the second user field.

In still another case, the indication information may be the resource unit allocation subfield and the first user field. For example, the first user field may indicate that the first PPDU is used for link adaptation, and the resource unit allocation subfield may indicate the resource used for link adaptation.

In still another case, the indication information may further be the resource unit allocation subfield and the bitmap. The bitmap may indicate, at a coarse granularity, a frequency band used for link adaptation or data transmission, and the resource unit allocation subfield may indicate the resource used for link adaptation. For example, it is assumed that the bitmap includes four bits, and each bit may correspond to an 80 MHz frequency band. If a 484-tone RU is allocated to a specific STA on a first 80 MHz frequency band for link adaptation, and 1 indicates link adaptation, the bitmap may be 1000. The bitmap may indicate that a first 80 MHz frequency band is used for link adaptation. The first 80 MHz frequency band corresponds to a first resource allocation subfield in the resource allocation subfield. The first resource allocation subfield may indicate that the 484-tone RU is used for link adaptation. In still another case, the indication information may alternatively be the bitmap and the first user field. In a possible case, the first user field indicates that the first PPDU is used for link adaptation, and the bitmap indicates the resource used for link adaptation. In another possible case, the bitmap may indicate, at a coarse granularity, a frequency band used for link adaptation or data transmission, and the first user field may indicate the resource used for link adaptation. For example, it is assumed that the bitmap includes four bits, and each bit may correspond to an 80 MHz frequency band. If a 484-tone RU is allocated to a specific STA on a first 80 MHz frequency band for link adaptation, and 1 indicates link adaptation, the bitmap may be 1000. The bitmap may indicate that a first 80 MHz frequency band is used for link adaptation. The first 80 MHz frequency band corresponds to a first resource allocation subfield in the resource allocation subfield. The first user field may indicate that the 484-tone RU is used for link adaptation.

It should be understood that, if the first PPDU does not include the first user field, user fields corresponding to the resource indicated by the indication information are the second user fields. If the first PPDU includes the first user field, a user field other than the first user field in the user fields corresponding to the resource indicated by the indication information is the second user field. Therefore, if the resource corresponds to the RU, and a quantity of user fields corresponding to the RU is greater than 1, a quantity of second user fields corresponding to the RU is a difference between a quantity of user fields (namely, the quantity of total user fields) corresponding to the RU and a quantity of first user fields corresponding to the RU. Information carried in different second user fields may be the same or may be different.

It should be understood that the tone may be replaced with a subcarrier.

It should be understood that the foregoing interpretation of different indication information is merely one or more example descriptions of the indication information, and does not constitute a limitation on interpretation of the indication information. There may be another interpretation manner.

Traditionally, only one to eight user fields are supported on one resource unit, because an excessive quantity of user fields on the resource unit indicate that the excessive quantity of user fields perform MU-MIMO simultaneously, and it is unnecessary to support so many users. However, in a case of link adaptation, the quantity of user fields corresponding to the resource unit may be actually not limited for interpretation. Therefore, in this case, the quantity of user fields corresponding to the resource unit is equal to a sum of quantities of user fields indicated by all resource unit allocation subfields corresponding to the resource unit, and this value is allowed to be greater than 8.

The M link adaptation blocks use different transmission parameters. The transmission parameter may include one or more of an MCS, beamforming, a measurement sequence, a spatial stream, and power. If there are a plurality of transmission parameters, the different transmission parameters may be that some transmission parameters are different, or may be that all transmission parameters are different. For example, a first link adaptation block uses MCS1 and power 1, and a second link adaptation block uses MCS2 and power 1. For another example, a first link adaptation block uses MCS1 and power 1, and a second link adaptation block uses MCS2 and power 2. That the resource is used to transmit the M link adaptation blocks may be understood as that the M link adaptation blocks are transmitted by using the resource. M is an integer greater than or equal to 1.

402: The second communication device sends a feedback result to the first communication device.

Correspondingly, the first communication device receives the feedback result from the second communication device.

After receiving the first PPDU from the first communication device, the second communication device may send the feedback result to the first communication device. The feedback result may be determined based on a measurement result corresponding to the M link adaptation blocks. The feedback result may be fed back through a PPDU.

The second communication device may measure the M link adaptation blocks by using the foregoing resource, that is, may receive the M link adaptation blocks on the foregoing resource, and measure the M link adaptation blocks. Measurement may be measuring one or more of reference signal received power (RSRP), reference signal receiving quality (RSRQ), a received signal strength indication (RSSI), a signal to interference plus noise ratio (SINR), and the like.

Then, the second communication device may determine the feedback result based on the measurement result. The second communication device may select one or more larger transmission parameters in the RSRP, RSRQ, RSSI, SINR, and the like. For example, one or more larger MCSs of the RSRP, RSRQ, RSSI, SINR, and the like may be selected.

After receiving the feedback result from the second communication device, the first communication device may send a second PPDU to the second communication device based on the feedback result. Correspondingly, the second communication device receives the second PPDU from the first communication device. The second PPDU is a PPDU used for data transmission.

In one case, both the first communication device and the second communication device may be APs. In another case, both the first communication device and the second communication device may be STAs. In still another case, the first communication device may be an AP, and the second communication device may be a STA. In still another case, the first communication device may be a STA, and the second communication device may be an AP.

It should be understood that the second communication device may feed back the feedback result by using HE link adaptation (LA) (or HLA)-control in A-control.

It should be understood that the first PPDU may include M pieces of indication information and the M link adaptation blocks, and the M pieces of indication information are in a one-to-one correspondence with the M link adaptation blocks. One piece of indication information in the M pieces of indication information may indicate a transmission resource of one of the M link adaptation blocks, that is, one piece of indication information may indicate the transmission resource of one link adaptation block.

It should be understood that for the resource, an RU may be replaced with an MRU, or an MRU may be replaced with an RU.

It should be understood that the first user field may indicate that the user field other than the first user field in the user fields corresponding to the resource is the second user field, namely, a user field used for link adaptation. The first user field is not used for link adaptation.

Figure 5:
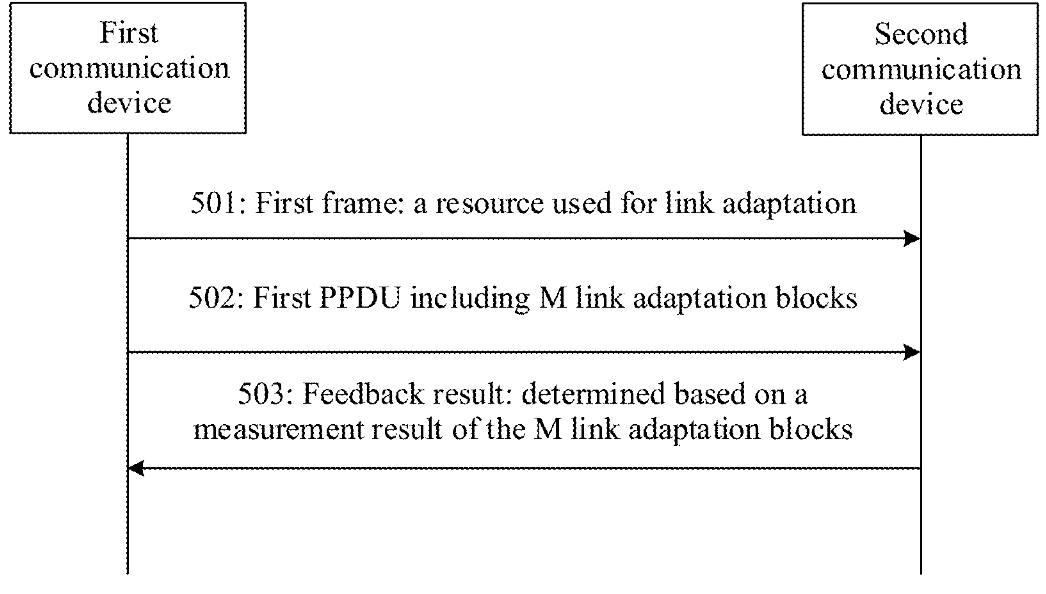
FIG. 5 is a schematic flowchart of another communication method according to an embodiment of this disclosure.

Based on the foregoing network architecture, FIG. 5 is a schematic flowchart of another communication method according to an embodiment of this disclosure. As shown in FIG. 5, the communication method may include the following steps.

501: A first communication device sends a first frame to a second communication device.

Correspondingly, the second communication device receives the first frame from the first communication device.

If needing to perform link adaptation, the first communication device may first send the first frame to the second communication device. The first frame may indicate a resource used for link adaptation in a PPDU, that is, may indicate a resource used for link adaptation in a subsequently transmitted PPDU, that is, may indicate a resource used for link adaptation in a PPDU, where there is a short interframe space (SIFS) between the PPDU and the first frame. For detailed description of the resource, refer to step 401.

Figure 6:
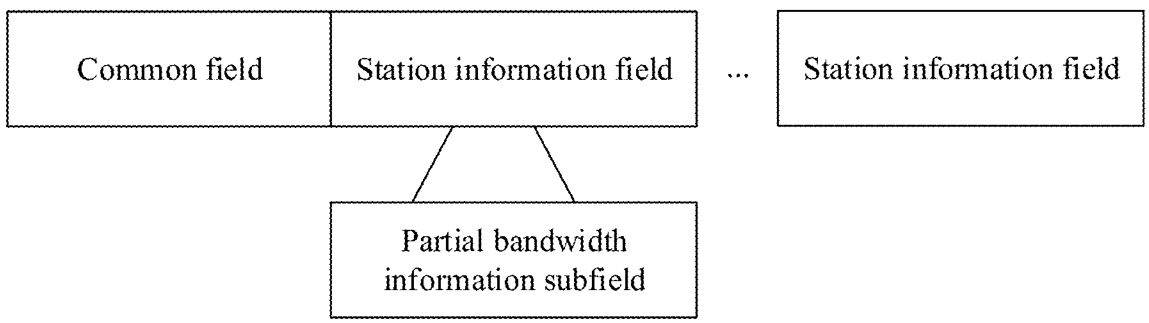
FIG. 6 is a schematic diagram of a first frame according to an embodiment of this disclosure.

FIG. 6 is a schematic diagram of a first frame according to an embodiment of this disclosure. As shown in FIG. 6, the first frame may include a common field and a station information field (or STA Info field). There may be one or more station information fields. The station information field may include a partial bandwidth information subfield.

It should be understood that FIG. 6 merely describes the first frame as an example, and does not constitute a limitation on the first frame. For example, the first frame may further include one or more of a frame control field, a duration field, a receiver address field, a transmitter address field, a frame check sequence (FCS) field, and the like.

In one case, different communication devices may be indicated by using partial bandwidth information subfields in station information fields corresponding to the different communication devices. To be specific, the first frame may include the station information field, the station information field may include the partial bandwidth information subfield, and the partial bandwidth information subfield may indicate a resource used for link adaptation by a station corresponding to the station information field. There may be one or more station information fields having the foregoing indication function. In second communication devices that can receive the first frame, a second communication device corresponding to the station information field in the first frame may perform step 503 based on the first frame and a first PPDU. If the first frame does not include the corresponding station information field, the second communication device cannot perform step 503 based on the first frame and a first PPDU.

In another case, different communication devices may be indicated by using a common field. The first frame may include the common field, and the common field may indicate a resource used for link adaptation in a PPDU. The second communication device that can receive the first frame may perform step 503 based on the first frame and the first PPDU.

502: The first communication device sends the first PPDU to the second communication device.

Correspondingly, the second communication device receives the first PPDU from the first communication device.

The first PPDU includes M link adaptation blocks, the M link adaptation blocks use different transmission parameters, and the resource is used to transmit the M link adaptation blocks. The first frame already indicates the resource used for link adaptation, a resource unit allocation subfield of the first PPDU may no longer carry indication information specially indicating link adaptation. In this case, a resource unit allocation subfield corresponding to the resource in the first PPDU indicates corresponding to 0 user fields.

For example, if a second 20 MHz frequency band of the first PPDU is used for link adaptation, a resource unit allocation subfield corresponding to the 20 MHz frequency band in the first PPDU may be indicated by 242 (0). The 242 (0) indicates that a resource unit does not have a corresponding user field. This may be considered as a deceptive operation. In the EHT, there are three index types corresponding to 0 user fields. One index type indicates corresponding to 0 user fields because a channel is punctured. Another index type indicates corresponding to 0 user fields because no user is allocated. Still another index type indicates that a corresponding content channel contributes to 0 user fields. Herein, a specific indication to be used to correspond to 0 user field is not limited.

The first PPDU may further include indication information indicating that the first PPDU is used for data transmission.

For other related detailed descriptions, refer to the related descriptions in step 401.

503: The second communication device sends a feedback result to the first communication device.

Correspondingly, the first communication device receives the feedback result from the second communication device.

After receiving the first frame and the first PPDU from the first communication device, the second communication device may send the feedback result to the first communication device. The feedback result is determined based on a measurement result corresponding to the M link adaptation blocks. The feedback result may be transmitted through the PPDU.

For other related detailed descriptions, refer to the related descriptions in step 402.

In one case, after determining the feedback result, the second communication device may directly send the feedback result to the first communication device. In another case, after the second communication device determines the feedback result, and receives, from the first communication device, a trigger frame used to trigger link adaptation, the second communication device may send the feedback result to the first communication device.

Figures 7, 8, 9:
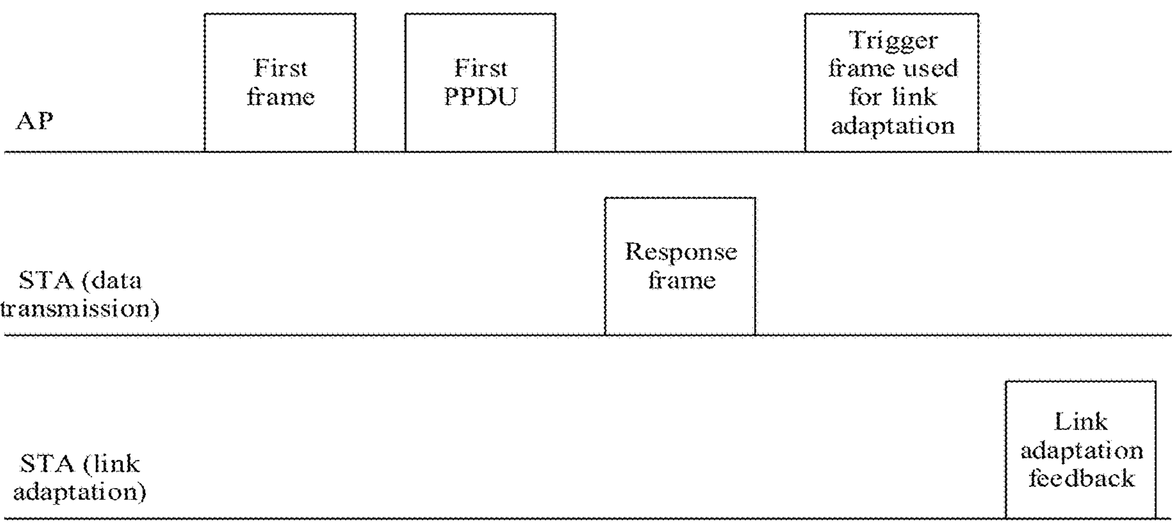
FIG. 7 is a schematic diagram of reporting a feedback result based on a trigger frame according to an embodiment of this disclosure.
FIG. 8 is a schematic diagram of a structure of a communication apparatus according to an embodiment of this disclosure.
FIG. 9 is a schematic diagram of a structure of another communication apparatus according to an embodiment of this disclosure.

FIG. 7 is a schematic diagram of reporting a feedback result based on a trigger frame according to an embodiment of this disclosure. As shown in FIG. 7, after a STA used for data transmission receives the first frame and the first PPDU, the STA may directly respond, after a STA used for link adaptation receives the first frame and the first PPDU, the STA needs to wait for receiving a trigger frame from an AP, and then the STA may respond. It should be understood that the foregoing example of reporting the feedback result based on the trigger frame is merely an example for description, and constitutes no limitation on reporting the feedback result.

It should be understood that a procedure in which the second communication device feeds back the feedback result after receiving the first PPDU is not limited.

It should be understood that the foregoing operations in various modes are merely examples, and are not limited to being used in a specific mode or PPDU. A general idea is as follows. A transmitting end device indicates, by using indication information, a type of a user field (a user field other than a first user field) corresponding to a resource indicated by a receiving end device is a link adaptation type.

It should be understood that a function performed by the first communication device in the foregoing communication method may also be performed by a module (for example, a chip) in the first communication device, and a function performed by the second communication device in the foregoing communication method may also be performed by a module (for example, a chip) in the second communication device.

Based on the foregoing network architecture, FIG. 8 is a schematic diagram of a structure of a communication apparatus according to an embodiment of this disclosure. As shown in FIG. 8, the communication apparatus may include a receiving unit 801 and a sending unit 802.

In one case, the communication apparatus may be a first communication device, or may be a module (for example, a chip) in a first communication device.

The sending unit 802 is configured to send a first PPDU, where the first PPDU includes indication information and M link adaptation blocks, the indication information indicates a resource used for link adaptation, the M link adaptation blocks use different transmission parameters, the resource is used to transmit the M link adaptation blocks, and M is an integer greater than or equal to 1.

The receiving unit 801 is configured to receive a feedback result, where the feedback result is determined based on a measurement result corresponding to the M link adaptation blocks.

In an embodiment, the sending unit 802 is further configured to send a second PPDU based on the feedback result.

In an embodiment, the indication information may be carried in one or more of the following: a first bit, a first user field, a punctured channel information field in a U-SIG, an RU allocation subfield, a bitmap, and an MCS index. The first bit may be a validate bit, or may be a disregard bit. The bitmap may be carried in the U-SIG, or may be carried in an EHT-SIG. A STA-ID included in the first user field is a specific STA-ID. The MCS is unavailable in an OFDMA transmission mode.

In an embodiment, the bitmap may indicate whether a frequency band indicated by each bit in the bitmap is used for link adaptation or data transmission.

In an embodiment, if the resource corresponds to an RU, the first user field is in a user field corresponding to the RU, and the user field corresponding to the RU is located in a content channel corresponding to the RU.

In an embodiment, the first user field may further include one or more of spatial stream information, beamforming information, MCS information, feedback type mode information, measurement sequence information, resource allocation information, power information, or measurement accuracy information.

In an embodiment, if the resource corresponds to the RU, and a quantity of user fields corresponding to the RU is greater than 1, a quantity of second user fields corresponding to the RU is a difference between the quantity of user fields corresponding to the RU and a quantity of first user fields corresponding to the RU, and a STA-ID included in the second user field is a STA-ID of a communication device used for link adaptation.

In an embodiment, the transmission parameter includes one or more of an MCS, beamforming, a measurement sequence, a spatial stream, and power.

For more detailed descriptions of both the receiving unit 801 and the sending unit 802, directly refer to the related descriptions of the first communication device in the method embodiment shown in FIG. 4. Details are not described herein again.

In another case, the communication apparatus may be a first communication device, or may be a module (for example, a chip) in a first communication device.

A sending unit 802 is configured to send a first frame, where the first frame indicates a resource used for link adaptation in a PPDU.

The sending unit 802 is further configured to send a first PPDU, where the first PPDU includes M link adaptation blocks, the M link adaptation blocks use different transmission parameters, the resource is used to transmit the M link adaptation blocks, and M is an integer greater than or equal to 1.

In an embodiment, the receiving unit 801 is configured to receive a feedback result, where the feedback result is determined based on a measurement result corresponding to the M link adaptation blocks.

The sending unit 802 is further configured to send a second PPDU based on the feedback result, where the second PPDU is used for data transmission.

In an embodiment, the first frame may include a station information field. The station information field may include a partial bandwidth information subfield. The partial bandwidth information subfield may indicate a resource used for link adaptation by a station corresponding to the station information field.

In an embodiment, the first frame may include a common field, and the common field indicates a resource used for link adaptation in the PPDU.

In an embodiment, a resource unit allocation subfield corresponding to the resource in the first PPDU indicates corresponding to 0 user fields.

For more detailed descriptions of both the receiving unit 801 and the sending unit 802, directly refer to the related descriptions of the first communication device in the method embodiment shown in FIG. 5. Details are not described herein again.

Based on the foregoing network architecture, FIG. 9 is a schematic diagram of a structure of another communication apparatus according to an embodiment of this disclosure. As shown in FIG. 9, the communication apparatus may include a receiving unit 901 and a sending unit 902. The communication apparatus may further include a measurement unit 903 and a determining unit 904.

In one case, the communication apparatus may be a second communication device, or may be a module (for example, a chip) in a second communication device.

The receiving unit 901 is configured to receive a first PPDU, where the first PPDU includes indication information and M link adaptation blocks, the indication information indicates a resource used for link adaptation, the M link adaptation blocks use different transmission parameters, the resource is used to transmit the M link adaptation blocks, and M is an integer greater than or equal to 1.

The sending unit 902 is configured to send a feedback result, where the feedback result is determined based on a measurement result corresponding to the M link adaptation blocks.

In an embodiment, the measurement unit 903 is configured to measure the M link adaptation blocks by using the resource.

The determining unit 904 is configured to determine the feedback result based on the measurement result.

In an embodiment, the indication information may be carried in one or more of the following: a first bit, a first user field, a punctured channel information field in a U-SIG, an RU allocation subfield, a bitmap, and an MCS index. The first bit may be a validate bit, or may be a disregard bit. The bitmap may be carried in the U-SIG, or may be carried in an EHT-SIG. A STA-ID included in the first user field is a specific STA-ID. The MCS is unavailable in an OFDMA transmission mode.

In an embodiment, the bitmap may indicate whether a frequency band indicated by each bit in the bitmap is used for link adaptation or data transmission.

In an embodiment, if the resource corresponds to an RU, the first user field is in a user field corresponding to the RU, and the user field corresponding to the RU is located in a content channel corresponding to the RU.

In an embodiment, the first user field may further include one or more of spatial stream information, beamforming information, MCS information, feedback type mode information, measurement sequence information, resource allocation information, power information, or measurement accuracy information.

In an embodiment, if the resource corresponds to the RU, and a quantity of user fields corresponding to the RU is greater than 1, a quantity of second user fields corresponding to the RU is a difference between the quantity of user fields corresponding to the RU and a quantity of first user fields corresponding to the RU, and a STA-ID included in the second user field is a STA-ID of a communication device used for link adaptation.

In an embodiment, the transmission parameter includes one or more of an MCS, beamforming, a measurement sequence, a spatial stream, and power.

For more detailed descriptions of the receiving unit 901, the sending unit 902, the measurement unit 903, and the determining unit 904, directly refer to the related descriptions of the second communication device in the method embodiment shown in FIG. 4. Details are not described herein again.

In another case, the communication apparatus may be a second communication device, or may be a module (for example, a chip) in a second communication device.

The receiving unit 901 is configured to receive a first frame, where the first frame indicates a resource used for link adaptation in a PPDU.

The receiving unit 901 is further configured to receive a first PPDU, where the first PPDU includes M link adaptation blocks, the M link adaptation blocks use different transmission parameters, the resource is used to transmit the M link adaptation blocks, and M is an integer greater than or equal to 1.

The sending unit 902 is configured to send a feedback result, where the feedback result is determined based on a measurement result corresponding to the M link adaptation blocks.

In an embodiment, the measurement unit 903 is configured to measure the M link adaptation blocks by using the resource.

The determining unit 904 is configured to determine the feedback result based on the measurement result.

In an embodiment, the first frame may include a station information field. The station information field may include a partial bandwidth information subfield. The partial bandwidth information subfield may indicate a resource used for link adaptation by a station corresponding to the station information field.

In an embodiment, the first frame may include a common field, and the common field indicates a resource used for link adaptation in the PPDU.

In an embodiment, a resource unit allocation subfield corresponding to the resource in the first PPDU indicates corresponding to 0 user fields.

For more detailed descriptions of the receiving unit 901, the sending unit 902, the measurement unit 903, and the determining unit 904, directly refer to the related descriptions of the second communication device in the method embodiment shown in FIG. 5. Details are not described herein again.

It should be understood that the foregoing units may be independent of each other, or may be integrated. For example, the receiving unit and the sending unit may be independent of each other, or may be integrated into a transceiver unit. For another example, the measurement unit and the determining unit may be independent of each other, or may be integrated into a processing unit.

Figure 10:
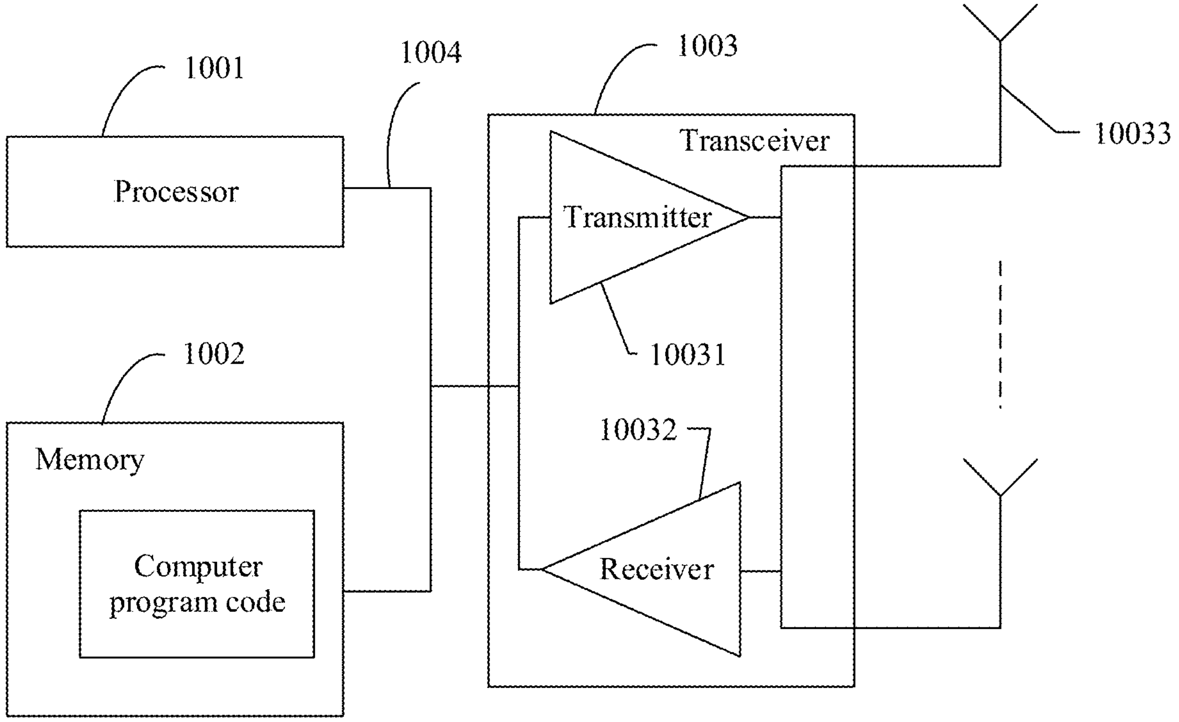
FIG. 10 is a schematic diagram of a structure of still another communication apparatus according to an embodiment of this disclosure.

Based on the foregoing network architecture, FIG. 10 is a schematic diagram of a structure of still another communication apparatus according to an embodiment of this disclosure. As shown in FIG. 10, the communication apparatus may include a processor 1001, a memory 1002, a transceiver 1003, and a bus 1004. The memory 1002 may exist independently, and may be connected to the processor 1001 through the bus 1004. The memory 1002 may alternatively be integrated with the processor 1001. The bus 1004 is configured to implement connections between these components. In one case, as shown in FIG. 10, the transceiver 1003 may include a transmitter 10031, a receiver 10032, and an antenna 10033. In another case, the transceiver 1003 may include a transmitter (namely, an output interface) and a receiver (namely, an input interface). The transmitter may include a transmitter machine and an antenna, and the receiver may include a receiver machine and an antenna.

The communication apparatus may be a first communication device, or may be a module in a first communication device. When computer program instructions stored in the memory 1002 are executed, the processor 1001 is configured to control the receiving unit 801 and the sending unit 802 to perform the operations performed in the foregoing embodiment, and the transceiver 1003 is configured to perform the operations performed by the receiving unit 801 and the sending unit 802 in the foregoing embodiment. The communication apparatus may be further configured to perform various methods performed by the first communication device in the method embodiments in FIG. 4 to FIG. 5. Details are not described again.

The communication apparatus may be a second communication device, or may be a module in a second communication device. When computer program instructions stored in the memory 1002 are executed, the processor 1001 is configured to control the receiving unit 901 and the sending unit 902 to perform the operations performed in the foregoing embodiment, the processor 1001 is further configured to perform the operations performed by the measurement unit 903 and the determining unit 904 in the foregoing embodiment, and the transceiver 1003 is configured to perform the operations performed by the receiving unit 901 and the sending unit 902 in the foregoing embodiment. The communication apparatus may be further configured to perform various methods performed by the second communication device in the method embodiments in FIG. 4 to FIG. 5. Details are not described again.

Figure 11:
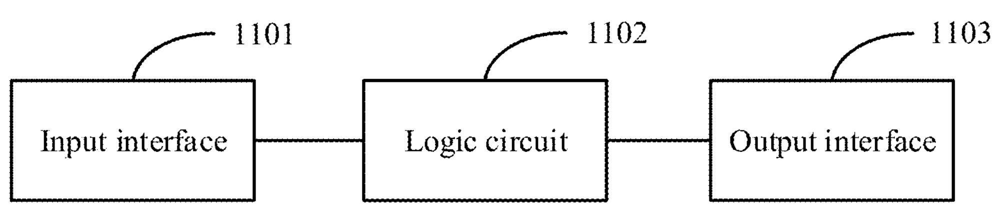
FIG. 11 is a schematic diagram of a structure of still another communication apparatus according to an embodiment of this disclosure.

Based on the foregoing network architecture, FIG. 11 is a schematic diagram of a structure of still another communication apparatus according to an embodiment of this disclosure. As shown in FIG. 11, the communication apparatus may include an input interface 1101, a logic circuit 1102, and an output interface 1103. The input interface 1101 is connected to the output interface 1103 through the logic circuit 1102. The input interface 1101 is configured to receive information from another communication apparatus, and the output interface 1103 is configured to output, schedule, or send information to the other communication apparatus. The logic circuit 1102 is configured to perform an operation other than the operations of the input interface 1101 and the output interface 1103, for example, implement functions implemented by the processor 1001 in the foregoing embodiment. The communication apparatus may be a terminal device (or a module in the terminal device), or may be a network device (or a module in the network device). For more detailed descriptions of the input interface 1101, the logic circuit 1102, and the output interface 1103, directly refer to the related descriptions of the first communication device or the second communication device in the foregoing method embodiments. Details are not described herein again.

It should be understood that the foregoing modules may be independent of each other, or may be integrated. For example, a transmitter, a receiver, and an antenna may be independent of each other, or may be integrated into a transceiver. For another example, the input interface and the output interface may be independent of each other, or may be integrated into a communication interface.

An embodiment of this disclosure further discloses a computer-readable storage medium storing instructions. When the instructions are executed, the method in the foregoing method embodiments is performed.

An embodiment of this disclosure further discloses a computer program product including computer instructions. When the computer instructions are executed, the methods in the foregoing method embodiments are performed.

An embodiment of this disclosure further discloses a communication system. The communication system may include a centralized controller, a routing calculator, and a routing performer. For specific descriptions, refer to the communication methods shown in FIG. 4 to FIG. 5.

In the foregoing specific implementations, the objectives, technical solutions, and beneficial effects of this disclosure are further described in detail. It should be understood that the foregoing descriptions are only specific implementations of this disclosure, but are not intended to limit the protection scope of this disclosure. Any modification, equivalent replacement, improvement, or the like made based on the technical solutions of this disclosure shall fall within the protection scope of this disclosure.

What is claimed is:

1. A method comprising:

sending a first physical layer protocol data unit (PPDU) comprising indication information and M link adaptation blocks, wherein the indication information indicates a resource for transmitting the M link adaptation blocks, wherein the M link adaptation blocks use different transmission parameters, wherein M is an integer greater than or equal to 1, wherein the resource corresponds to a resource unit (RU), wherein a first quantity of first user fields corresponding to the RU is greater than 1, wherein a second quantity of second user fields corresponding to the RU is a difference between the first quantity of the first user fields and a third quantity of third user fields corresponding to the RU, and wherein a station identifier (STA-ID) comprised in each of the second user fields is of a communication device for link adaptation; and receiving a feedback result that is based on a measurement result corresponding to the M link adaptation blocks.

2. The method of claim 1, wherein the indication information is carried in one or more of:

a first bit, wherein the first bit is a validate bit or a disregard bit; or a third user field of the third user fields comprising a specific STA-ID.

3. The method of claim 2, wherein the indication information is further carried in a bitmap carried in a universal signal field (U-SIG) or an Extremely High Throughput signal field (EHT-SIG), and wherein the bitmap indicates that a frequency band indicated by each bit in the bitmap is for link adaptation or data transmission.

4. The method of claim 2, wherein the third user field is positioned as the first among the first, second, and third user fields, and wherein the first, second, and third user fields are located in a content channel corresponding to the RU.

5. The method of claim 2, wherein the third user field further comprises one or more of spatial stream information, beamforming information, MCS information, feedback type mode information, measurement sequence information, resource allocation information, power information, or measurement accuracy information.

6. The method of claim 1, wherein each of the different transmission parameters comprises one or more of a modulation and coding scheme (MCS), beamforming, a measurement sequence, a spatial stream, or power.

7. The method of claim 1, further comprising sending a second PPDU to the communication device based on the feedback result, wherein the second PPDU is for data transmission.

8. A method comprising:

receiving a first physical layer protocol data unit (PPDU) comprising indication information and M link adaptation blocks, wherein the indication information indicates a resource for transmitting the M link adaptation blocks, wherein the M link adaptation blocks use different transmission parameters, wherein M is an integer greater than or equal to 1, wherein the resource corresponds to a resource unit (RU), wherein a first quantity of first user fields corresponding to the RU is greater than 1, wherein a second quantity of second user fields corresponding to the RU is a difference between the first quantity of the first user fields and a third quantity of third user fields corresponding to the RU, and wherein a station identifier (STA-ID) comprised in each of the second user fields is of a communication device for link adaptation; and sending a feedback result that is based on a measurement result corresponding to the M link adaptation blocks.

9. The method of claim 8, wherein the indication information is carried in one or more of:

a punctured channel information field in a universal signal field (U-SIG); or a resource unit allocation subfield.

10. The method of claim 9, wherein the indication information is further carried in a bitmap carried in the U-SIG or an Extremely High Throughput signal field (EHT-SIG), and wherein the bitmap indicates that a frequency band indicated by each bit in the bitmap is for link adaptation or data transmission.

11. The method of claim 9, wherein the indication information is further carried in a third user field of the third user fields comprising a specific station identifier (STA-ID), wherein the third user field is positioned as the first among the first, second, and third user fields, and wherein the first, second, and third user fields are located in a content channel corresponding to the RU.

12. The method of claim 9, wherein the indication information is further carried in a third user field of the third user fields comprising a specific station identifier (STA-ID), wherein the third user field further comprises one or more of spatial stream information, beamforming information, MCS information, feedback type mode information, measurement sequence information, resource allocation information, power information, or measurement accuracy information.

13. The method of claim 8, further comprising receiving a second PPDU from the communication device based on the feedback result, wherein the second PPDU is for data transmission.

14. The method of claim 8, wherein each of the different transmission parameters comprises one or more of a modulation and coding scheme (MCS), beamforming, a measurement sequence, a spatial stream, or power.

15. A communication apparatus comprising:

a memory configured to store instructions; and a processor in communication with the memory and configured to execute the instructions to cause the communication apparatus to:

send a first physical layer protocol data unit (PPDU) comprising indication information and M link adaptation blocks, wherein the indication information indicates a resource for transmitting the M link adaptation blocks, wherein the M link adaptation blocks use different transmission parameters, wherein M is an integer greater than or equal to 1, wherein the resource corresponds to a resource unit (RU), wherein a first quantity of first user fields corresponding to the RU is greater than 1, wherein a second quantity of second user fields corresponding to the RU is a difference between the first quantity of the first user fields and a third quantity of third user fields corresponding to the RU, and wherein a station identifier (STA-ID) comprised in each of the second user fields is of a communication device for link adaptation; and receive a feedback result that is based on a measurement result corresponding to the M link adaptation blocks.

16. The communication apparatus of claim 15, wherein the indication information is carried in one or more of:

a bitmap carried in the U SIG a universal signal field (U-SIG) or an Extremely High Throughput signal field (EHT-SIG); or a modulation and coding scheme (MCS) index.

17. The communication apparatus of claim 16, wherein the bitmap indicates that a frequency band indicated by each bit in the bitmap is for link adaptation or data transmission.

18. The communication apparatus of claim 16, wherein the indication information is further carried in a third user field of the third user fields comprising a specific station identifier (STA-ID), wherein the third user field is positioned as the first among the first, second, and third user fields, and wherein the first, second, and third user fields are located in a content channel corresponding to the RU.

19. The communication apparatus of claim 16, wherein the indication information is further carried in a third user field of the third user fields comprising a specific station identifier (STA-ID), wherein the third user field further comprises one or more of spatial stream information, beamforming information, MCS information, feedback type mode information, measurement sequence information, resource allocation information, power information, or measurement accuracy information.

20. The communication apparatus of claim 15, wherein the processor is further configured to execute the instructions to cause the communication apparatus to send a second PPDU to the communication device based on the feedback result, wherein the second PPDU is for data transmission.

* * * * *